(12) United States Patent
Ikuma et al.

(10) Patent No.: US 10,785,430 B2
(45) Date of Patent: Sep. 22, 2020

(54) SOLID-STATE IMAGING DEVICE AND IMAGING APPARATUS

(71) Applicant: Panasonic Intellectual Property Management Co., Ltd., Osaka (JP)

(72) Inventors: Makoto Ikuma, Kyoto (JP); Takahiro Muroshima, Kyoto (JP); Takayasu Kito, Osaka (JP); Hiroyuki Amikawa, Kyoto (JP); Tetsuya Abe, Kyoto (JP)

(73) Assignee: PANASONIC SEMICONDUCTOR SOLUTIONS CO., LTD., Kyoto (JP)

( * ) Notice: Subject to any disclaimer, the term of this patent is extended or adjusted under 35 U.S.C. 154(b) by 43 days.

(21) Appl. No.: 16/059,485

(22) Filed: Aug. 9, 2018

(65) Prior Publication Data

US 2018/0376083 A1 Dec. 27, 2018

Related U.S. Application Data

(63) Continuation of application No. PCT/JP2017/005057, filed on Feb. 13, 2017.

(30) Foreign Application Priority Data

Feb. 15, 2016 (JP) .................................. 2016-026398

(51) Int. Cl.
*H04N 5/355* (2011.01)
*H04N 5/359* (2011.01)
(Continued)

(52) U.S. Cl.
CPC ............. *H04N 5/359* (2013.01); *G02B 26/10* (2013.01); *H04N 5/23229* (2013.01);
(Continued)

(58) Field of Classification Search
CPC ...... H04N 5/351; H04N 5/353; H04N 5/3535; H04N 5/35536; H04N 5/3554; H04N 5/35563
(Continued)

(56) References Cited

U.S. PATENT DOCUMENTS 8,766,157 B2* 7/2014 Levine ................. H04N 5/3592
250/208.1
10,257,448 B1* 4/2019 Tower ............... H01L 27/14614
(Continued)

FOREIGN PATENT DOCUMENTS

JP 2007-124400 A 5/2007

OTHER PUBLICATIONS

International Search Report issued in Application No. PCT/JP2017/005057 dated May 9, 2017, with English translation.

*Primary Examiner* — Anthony J Daniels
(74) *Attorney, Agent, or Firm* — McDermott Will & Emery LLP

(57) ABSTRACT

A solid-state imaging device includes: a pixel including a photoelectric converter that generates a charge and a charge accumulator that converts the charge into a voltage; a controller that causes the pixel to perform exposure in a first exposure mode and convert the charge into the voltage with a first gain to output a first pixel signal, and causes the pixel to perform exposure in a second exposure mode and convert the charge into the voltage with a second gain to output a second pixel signal, the second exposure mode being shorter in exposure time than the first exposure mode, and the second gain being lower than the first gain; and a signal processor that synthesizes the second pixel signal after amplification and the first pixel signal.

10 Claims, 17 Drawing Sheets

(51) Int. Cl.
  *H04N 5/378* (2011.01)
  *G02B 26/10* (2006.01)
  *H04N 5/232* (2006.01)

(52) U.S. Cl.
  CPC ....... *H04N 5/3559* (2013.01); *H04N 5/35563* (2013.01); *H04N 5/35581* (2013.01); *H04N 5/378* (2013.01)

(58) Field of Classification Search
  USPC .................. 348/294, 296, 297, 300–302
  See application file for complete search history.

(56) References Cited

U.S. PATENT DOCUMENTS

| | | | |
|---|---|---|---|
| 2007/0035649 A1* | 2/2007 | McKee | H01L 27/14609 348/308 |
| 2007/0097240 A1 | 5/2007 | Egawa et al. | |
| 2008/0042046 A1* | 2/2008 | Mabuchi | H01L 27/14634 250/208.1 |
| 2015/0201140 A1* | 7/2015 | Solhusvik | H04N 5/3559 348/229.1 |
| 2015/0312557 A1* | 10/2015 | Kim | H04N 5/3535 348/46 |
| 2015/0350574 A1* | 12/2015 | Okado | H04N 5/378 348/308 |
| 2016/0255289 A1* | 9/2016 | Johnson | H04N 5/355 348/273 |
| 2017/0070691 A1* | 3/2017 | Nishikido | H04N 5/35581 |

* cited by examiner

SOLID-STATE IMAGING DEVICE AND IMAGING APPARATUS

CROSS REFERENCE TO RELATED APPLICATIONS

This application is a U.S. continuation application of PCT International Patent Application Number PCT/JP2017/005057 filed on Feb. 13, 2017, claiming the benefit of priority of Japanese Patent Application Number 2016-026398 filed on Feb. 15, 2016, the entire contents of which are hereby incorporated by reference.

BACKGROUND

1. Technical Field

The present disclosure relates to a solid-state imaging device and an imaging apparatus.

2. Description of the Related Art

Conventionally, for example, a method described in Japanese Unexamined Patent Application Publication No. 2007-124400 has been proposed to expand the dynamic range in a complementary metal oxide semiconductor (CMOS) solid-state imaging device having a column parallel type AD converter. The method in Japanese Unexamined Patent Application Publication No. 2007-124400 expands the dynamic range by synthesizing a signal with a long exposure time and a signal with a short exposure time.

SUMMARY

Although the dynamic range can be expanded by the method in Japanese Unexamined Patent Application Publication No. 2007-124400, no technique for enhancing image quality in dark time has been disclosed. There is thus a problem in that it is impossible to achieve both image quality enhancement in dark time and dynamic range expansion.

In view of this problem, one aspect of the present disclosure provides a solid-state imaging device and an imaging apparatus that achieve both image quality enhancement in dark time and dynamic range expansion.

To solve the problem stated above, a solid-state imaging device according to one aspect of the present disclosure includes: a pixel including a photoelectric converter that generates a charge and a charge accumulator that converts the charge into a voltage; a controller that causes the pixel to perform exposure in a first exposure mode and convert the charge into the voltage with a first gain to output a first pixel signal, and causes the pixel to perform exposure in a second exposure mode and convert the charge into the voltage with a second gain to output a second pixel signal, the second exposure mode being shorter in exposure time than the first exposure mode, and the second gain being lower than the first gain; and a signal processor that synthesizes the second pixel signal after amplification and the first pixel signal.

The solid-state imaging device and the imaging apparatus according to one aspect of the present disclosure can achieve both image quality enhancement in dark time and dynamic range expansion.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

Figure 1A:
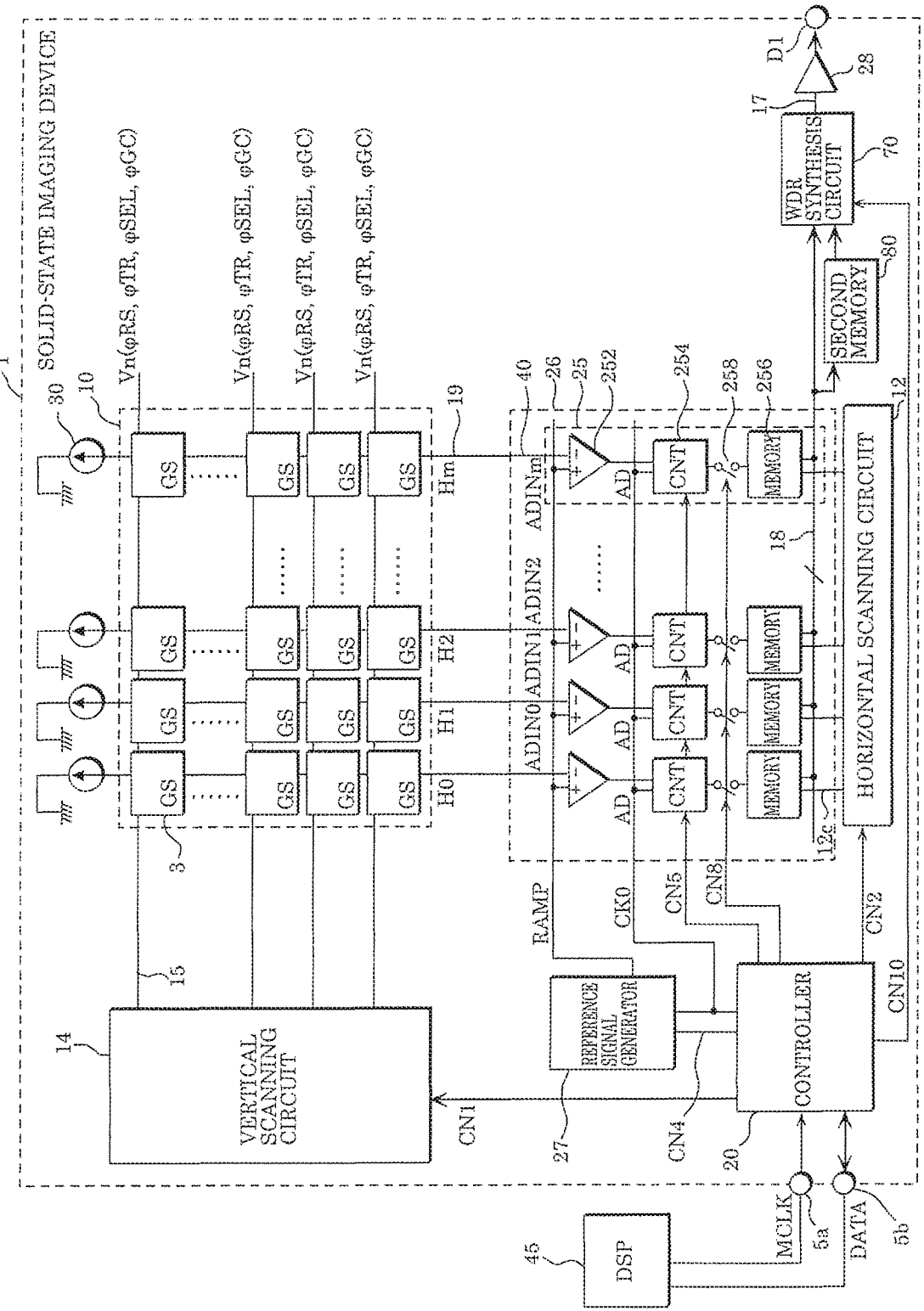
FIG. 1A is a block diagram illustrating an example of the structure of a solid-state imaging device according to an embodiment.

DETAILED DESCRIPTION OF THE EMBODIMENTS (Circumstances Leading to Present Disclosure)

The inventors noticed that methods for dynamic range expansion are not limited to the conventional method disclosed in relation to solid-state imaging devices, but also include a technique of switching FD conversion gain (i.e. charge-voltage conversion gain in floating diffusion (FD)) in a pixel.

With such a method, for example in bright time, the FD conversion gain is set to be low so that the voltage in an FD portion will not be saturated even in a state where the charge of a photodiode has reached a saturation level. Thus, by decreasing the FD conversion gain for a bright object, the gray scale corresponding to the object is accurately reproduced to achieve output of an image with no blown-out highlights (i.e. achieve dynamic range expansion).

On the other hand, for example in dark time, the FD conversion gain is set to be high so that the voltage (pixel signal) corresponding to the amount of light received will be high relative to noise which occurs in a pixel amplification transistor or an analog circuit. Thus, by increasing the FD conversion gain for a dark object, output of a high-quality image with a high signal to noise ratio (SN) is achieved.

The inventors therefore conceived combining the method of switching the FD conversion gain with the method of expanding the dynamic range by synthesizing a signal with a long exposure time and a signal with a short exposure time, to provide a solid-state imaging device and the like that achieve both image quality enhancement in dark time and dynamic range expansion.

A solid-state imaging device according to each embodiment of the present disclosure is described below, with reference to drawings.

Herein, description detailed more than necessary may be omitted.

For example, detailed description of well-known matters or repeated description of the substantially same structures may be omitted. This is to avoid unnecessarily redundant description and facilitate the understanding of a person skilled in the art. The accompanying drawings and the following description are provided to help a person skilled in the art to fully understand the present disclosure, and are not intended to limit the subject matter defined in the appended claims. The embodiments described below each show a specific example of the present disclosure. The numerical values, shapes, structural elements, the arrangement and connection of the structural elements, the sequence of processes, etc. shown in the following embodiments are mere examples, and do not limit the scope of the present disclosure.

Embodiment 1

An overview of a solid-state imaging device according to this embodiment is given below.

The solid-state imaging device according to this embodiment employs a technique of switching FD conversion gain in a pixel so that the FD conversion gain will be increased during long exposure in a wide dynamic operation to reduce noise and decreased during short exposure to expand the dynamic range. Such a solid-state imaging device achieves both image quality enhancement in dark time and dynamic range expansion.

[1. Structure of Solid-State Imaging Device]

FIG. 1A is a block diagram illustrating an example of the structure of solid-state imaging device 1 according to this embodiment. Solid-state imaging device 1 includes pixel array unit 10, horizontal scanning circuit 12, vertical scanning circuit 14, a plurality of vertical signal lines 19, controller 20, column processor 26, reference signal generator 27, output circuit 28, a plurality of load current sources 30, WDR synthesis circuit 70, and second memory (e.g. line memory) 80, as illustrated in the drawing. Solid-state imaging device 1 is provided with terminals such as an MCLK terminal for receiving input of a master clock signal from the outside, a DATA terminal for transmitting/receiving commands or data with the outside, a D1 terminal for transmitting video data to the outside, and other terminals through which a power voltage, a ground voltage, and the like are supplied.

Pixel array unit 10 has a plurality of pixels 3 (also referred to as unit cells) arranged in a matrix. The plurality of pixels 3 are arranged in n rows and m columns (n and m are natural numbers) in FIG. 1A. Pixel 3 has a function of switching the pixel gain (FD conversion gain), and switches the FD conversion gain depending on exposure time under control of controller 20. Pixel 3 will be described in detail later.

Horizontal scanning circuit 12 sequentially scans memories 256 (first memories) in a plurality of column AD circuits 25 included in column processor 26, to output AD-converted pixel signals to wide dynamic range (WDR) synthesis circuit 70 or second memory 80 via horizontal signal line 18.

Vertical scanning circuit 14 scans horizontal scanning line group 15 (also referred to as "row control line group") provided for each row of pixels 3 in pixel array unit 10, on a row basis. Thus, vertical scanning circuit 14 selects pixels 3 on a row basis, to simultaneously output pixel signals from pixels 3 belonging to a selected row to m vertical signal lines 19. The same number of horizontal scanning line groups 15 as the rows of pixels 3 are provided. In FIG. 1A, n horizontal scanning line groups 15 (V1, V2, . . . , Vn in FIG. 1A) are provided. Each horizontal scanning line group 15 includes a reset control line for applying reset control signal φRS, a read control line for applying read control signal φTR, a selection control line for applying selection control signal φSEL, and an FD conversion gain control line for applying FD conversion gain control signal φGC.

Vertical signal line 19 is provided for each column of pixels 3 in pixel array unit 10, and conveys a pixel signal from pixel 3 belonging to a selected pixel row to column processor 26. In pixel array unit 10, m vertical signal lines 19 of H0 to Hm are arranged. A downstream part of vertical signal line 19, that is, a part connected to a minus input terminal of column AD circuit 25 in column processor 26, is called ADC input line 40. In detail, m ADC input lines 40 of ADIN0 to ADINm are arranged between pixel array unit 10 and column processor 26.

Controller 20 controls whole solid-state imaging device 1 by generating various control signal groups. The various control signal groups include control signals CN1, CN2, CN5, CN8, and CN10 and count clock CK0. For example, controller 20 receives master clock MCLK from digital signal processor (DSP) 45 outside solid-state imaging device 1 via terminal 5a, and generates various internal clocks to control horizontal scanning circuit 12, vertical scanning circuit 14, and the like. For example, controller 20 receives various types of data from DSP 45 via terminal 5b, and generates various control signal groups based on the data. DSP 46 may be included in solid-state imaging device 1.

Column processor 26 includes column AD circuit 25 for each column. Each column AD circuit 25 AD-converts a pixel signal from vertical signal line 19.

Column AD circuit 25 includes voltage comparator 252, counter 254, and memory 256.

Voltage comparator 252 compares an analog pixel signal conveyed from vertical signal line 19 and reference signal RAMP generated by reference signal generator 27 and including a triangular wave. For example, in the case where the analog pixel signal is greater than reference signal RAMP, voltage comparator 252 inverts an output signal indicating the comparison result.

Counter 254 counts the time from the start of change of the triangular wave in reference signal RAMP to the inversion of the output signal of voltage comparator 252. Since the time to the inversion depends on the value of the analog pixel signal, the count value is the value of the digitized pixel signal.

Memory 256 holds the count value of counter 254, i.e. the digital pixel signal.

Reference signal generator 27 generates reference signal RAMP inducing a triangular wave, and outputs reference signal RAMP to a plus input terminal of voltage comparator 252 in each column AD circuit 25.

WDR synthesis circuit 70 obtains digital pixel signals that differ in exposure time from each other, namely, a digital pixel signal supplied via horizontal signal line 18 and a digital pixel signal held in second memory 80. WDR synthesis circuit 70 synthesizes the obtained two pixel signals, and outputs a pixel signal resulting from the synthesis to output circuit 28 via output signal line 17. WDR synthesis circuit 70 will be described in detail later.

Second memory 80 is a storage that stores a digital pixel signal supplied via horizontal signal line 18, in association with each row of pixel array unit 10.

Output circuit 28 converts the pixel signal output from WDR synthesis circuit 70 into a signal suitable for external output of solid-state imaging device 1, and outputs the signal to video data terminal D1.

Load current source 30 is a load circuit that is provided for each vertical signal line 19 and supplies a load current to vertical signal line 19. In detail, load current source 30 supplies a load current to an amplification transistor in selected pixel 3 via vertical signal line 19, thus forming a source follower circuit together with the amplification transistor.

Figure 1B:
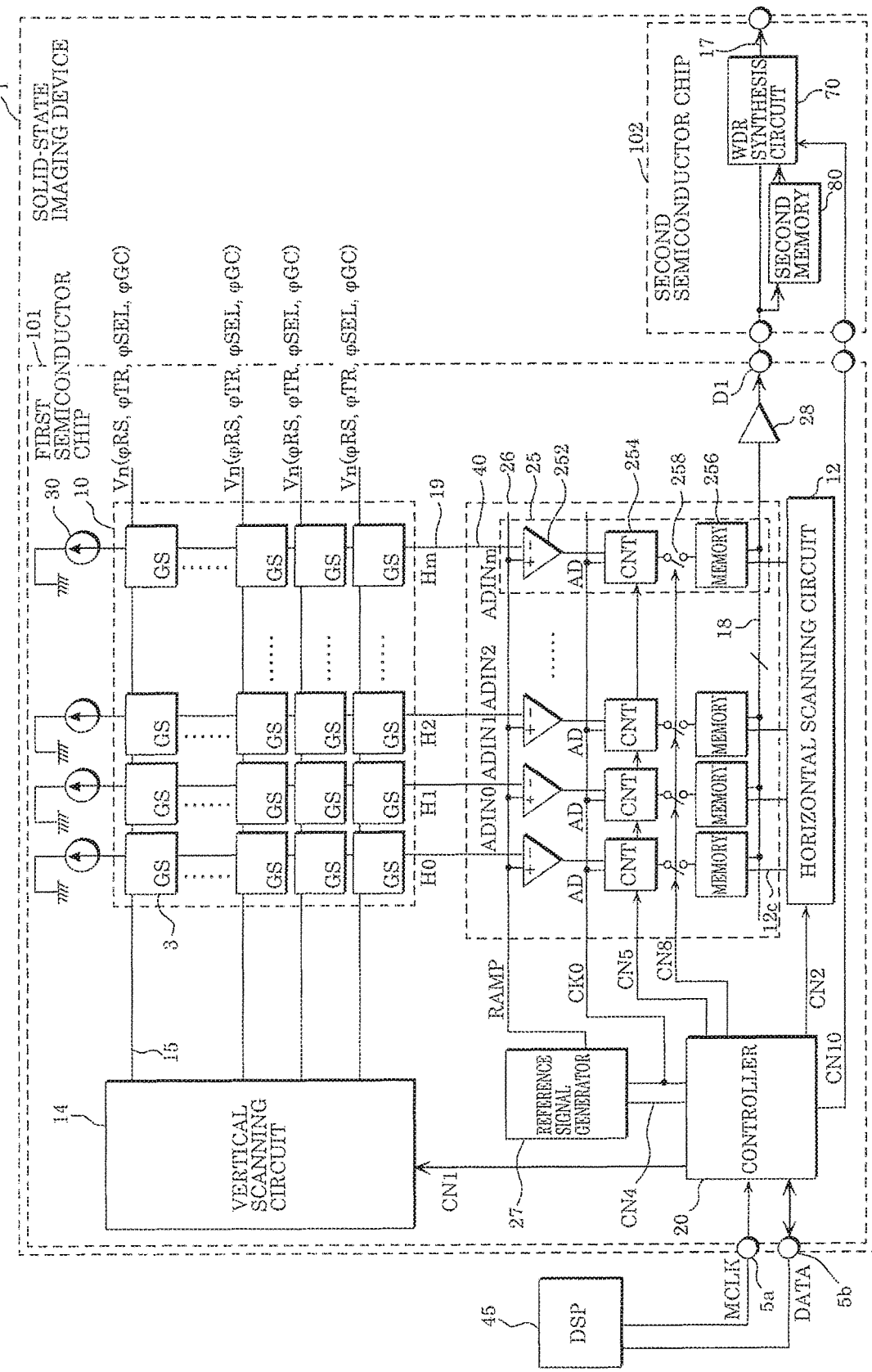
FIG. 1B is a block diagram illustrating another example of the structure of the solid-state imaging device according to the embodiment.

Such solid-state imaging device 1 is, for example, formed on one semiconductor chip. Alternatively, solid-state imaging device 1 may be formed on a plurality of semiconductor chips (e.g. two semiconductor chips). FIG. 1B is a block diagram illustrating an example of the structure of such solid-state imaging device 1. As illustrated in FIG. 1B, solid-state imaging device 1 according to this embodiment may have at least the plurality of pixels 3 formed on first semiconductor chip 101, and at least second memory 80 and WDR synthesis circuit 70 formed on second semiconductor chip 102 other than first semiconductor chip 101.

[2. Structure and Operation of Pixel]

The structure and operation of pixel 3 having an FD gain switching function are described below, with reference to FIGS. 2A and 2B.

Figure 2A:
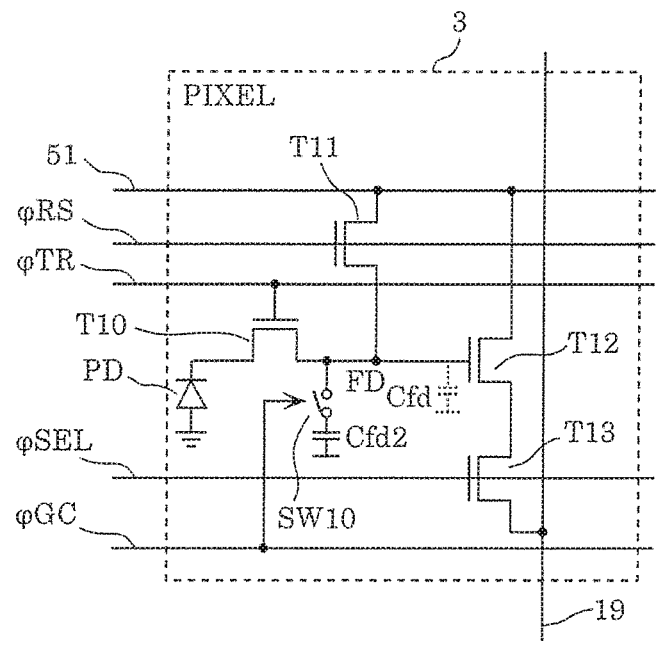
FIG. 2A is a circuit diagram illustrating the structure of a pixel.

FIG. 2A is a circuit diagram illustrating the structure of pixel 3. FIG. 2B is a timing chart illustrating the operation of pixel 3.

As illustrated in FIG. 2A, each pixel 3 includes photodiode PD which is a light-receiving element (photoelectric converter), read transistor T10, floating diffusion layer FD, reset transistor T11, amplification transistor T12, selection transistor T13, gain control switch element SW10, and additional capacitor Cfd2.

Photodiode PD is a photoelectric converter that photoelectrically converts incident light, and generates a charge corresponding to the amount of light received (incident light).

Read transistor T10 is a switch element that is controlled according to read control signal qTR applied via a read control line, and reads (i.e. transfers) the signal generated by photodiode PD.

Floating diffusion layer FD is a charge accumulator that accumulates the charge generated by the photoelectric conversion and converts the accumulated charge into a voltage with a predetermined gain. In detail, floating diffusion layer FD temporarily holds the charge read by read transistor T10.

Reset transistor T11 is a reset switch element that resets the voltage of floating diffusion layer FD to the power voltage, and has one end connected to floating diffusion layer FD and the other end connected to power line 51. Reset transistor T11 is controlled according to reset control signal VoRS applied via a reset control line.

Amplification transistor T12 is a transistor that amplifies the voltage corresponding to the charge held in floating diffusion layer FD and outputs the amplified signal to vertical signal line 19 via selection transistor T13 as a pixel signal.

Selection transistor T13 is a transistor that is controlled according to selection control signal φSEL applied via a selection control line and selects whether or not to output the pixel signal of amplification transistor T12 to vertical signal line 19.

Gain control switch element SW10 is, for example, a transistor that is connected to floating diffusion layer FD and is switched between a conducting state (on state) and a non-conducting state (off state) according to FD conversion gain control signal φGC applied via an FD conversion gain control line. In this embodiment, gain control switch element SW10 is in the on state when FD conversion gain control signal φGC is High, and in the off state when FD conversion gain control signal φGC is Low.

Additional capacitor Cfd2 is a capacitor connected to floating diffusion layer FD via gain control switch element SW10.

Figure 2B:
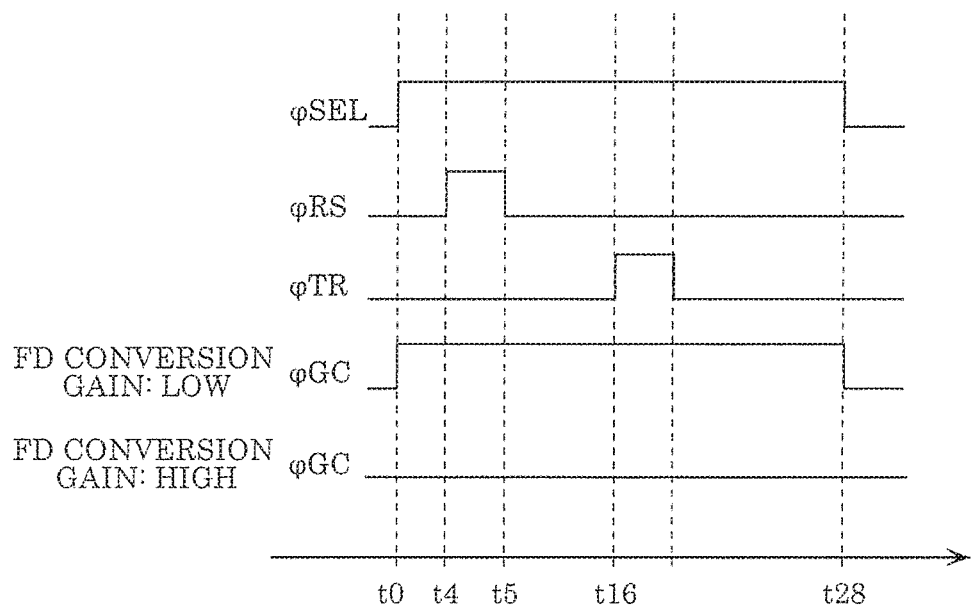
FIG. 2B is a timing chart illustrating the operation of the pixel.

Pixel 3 having such a structure outputs a pixel signal to vertical signal line 19 by the operation illustrated in FIG. 2B. The operation illustrated in FIG. 2B will be described in detail later, with reference to FIG. 4. An operation of switching the FD conversion gain in pixel 3 is mainly described here.

The charge-voltage conversion gain (pixel gain) in pixel 3 is proportional to the inverse of the capacitance of floating diffusion layer FD, and is referred to as "FD conversion gain". The FD conversion gain is switched by switching gain control switch element SW10 between the on state and the off state according to the polarity of FD conversion gain control signal φGC. In detail, as illustrated in FIG. 2B, when φGC=Low during read (time t16 in the drawing), gain control switch element SW10 is in the off state, so that the capacitance of floating diffusion layer FD is Cfd. In this case, the FD conversion gain is high. When <GC=High during read, gain control switch element SW10 is in the on state, so that the capacitance of floating diffusion layer FD is Cfd+Cfd2. In this case, the FD conversion gain is low.

In other words, controller 20 sets gain control switch element SW10 to the off state to cause the conversion of the charge into the voltage with a first gain (GH), and sets gain control switch element SW10 to the on state to cause the conversion of the charge into the voltage with a second gain (GL, where GL<GH). In detail, in the case where the FD conversion gain is low, vertical scanning circuit 14 which scans pixel array unit 10 by controller 20 sets FD conversion gain control signal φGC to High level during a period in which selection control signal φSEL is High level. In the case where the FD conversion gain is high, on the other hand, vertical scanning circuit 14 sets FD conversion gain control signal φGC to Low level during the period.

[3. Operation of Solid-State Imaging Device]

The operation of solid-state imaging device 1 in Embodiment 1 having the above-mentioned structure is described below.

Figure 3:
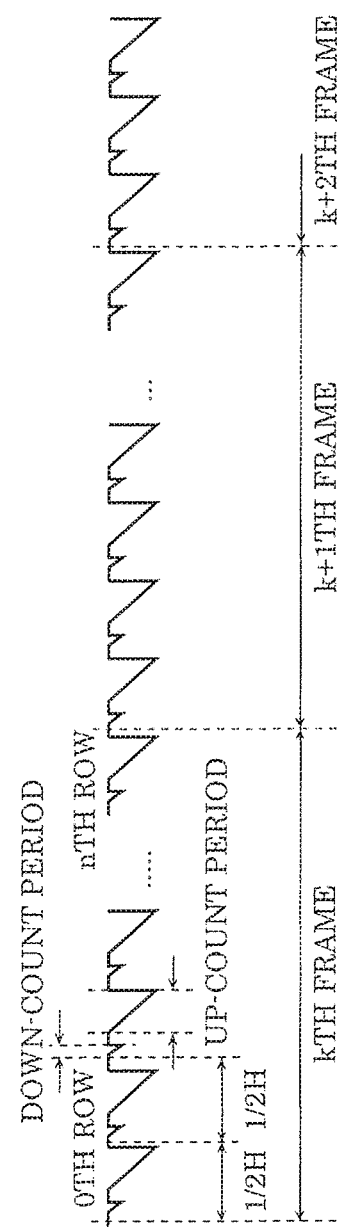
FIG. 3 is a timing chart illustrating an example of the operation of the solid-state imaging device in a plurality of frame periods.

FIG. 3 is a timing chart illustrating an example of the operation of solid-state imaging device 1 in a plurality of frame periods. The drawing schematically illustrates the waveform of reference signal RAMP from the kth frame to the k+2th frame. One frame is composed of n horizontal scanning periods (periods of ½H in the drawing) corresponding to the first row to the nth row of pixel array unit 10 formed by pixels 3 in n rows and m columns.

Figure 4:
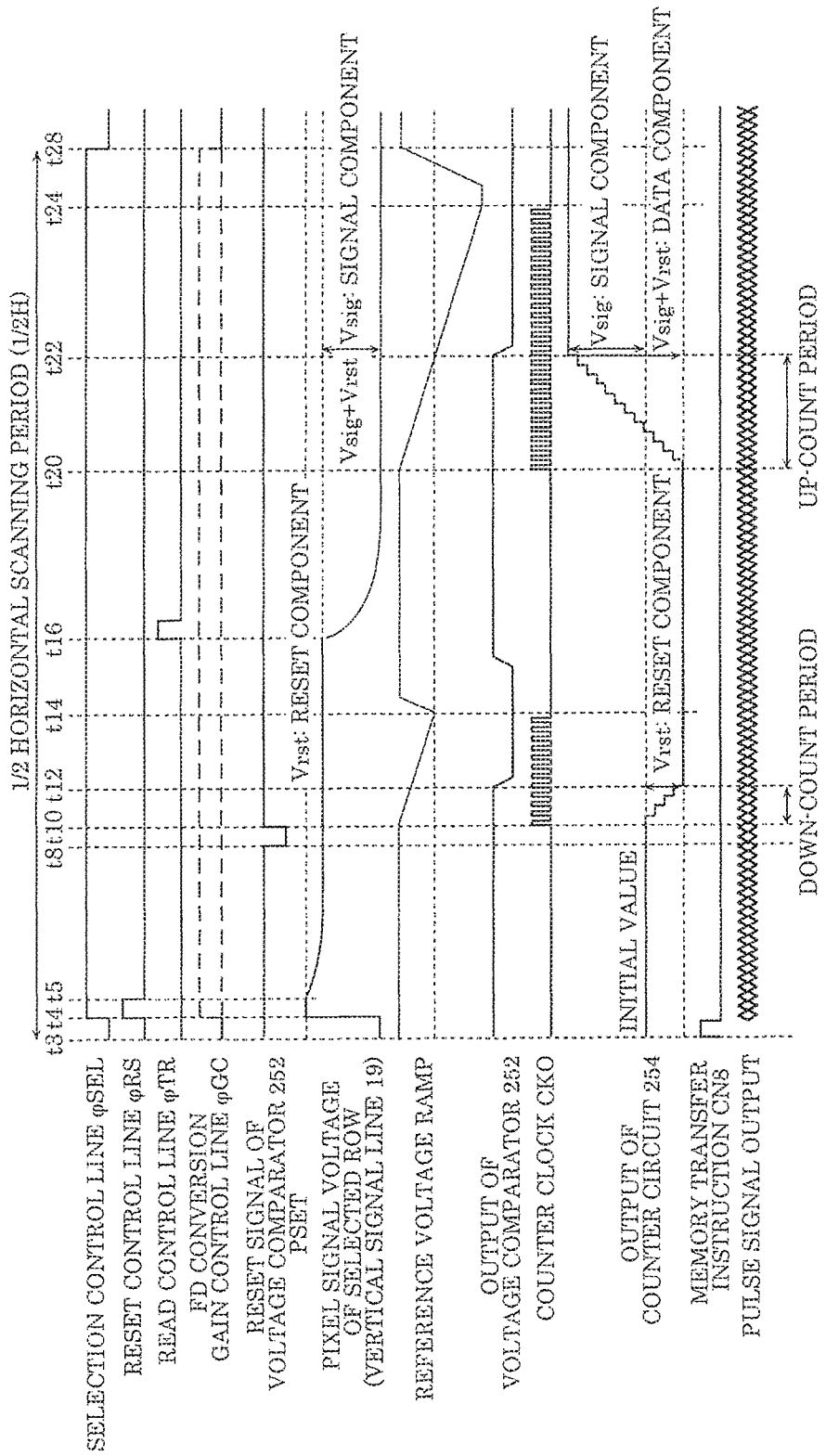
FIG. 4 is a timing chart illustrating an example of the operation of the solid-state imaging device in a ½ horizontal scanning period.

FIG. 4 is a timing chart illustrating an example of the operation of solid-state imaging device 1 in a ½ horizontal scanning period.

In each ½ horizontal scanning period, reference signal RAMP forms a triangular wave in each of a down-count period and an up-count period, as illustrated in FIGS. 3 and 4. During long exposure, the inclination of reference signal RAMP may be decreased to increase the analog gain, thus improving noise performance. During short exposure, the inclination of reference signal RAMP may be increased to decrease the analog gain, thus ensuring a sufficient dynamic range.

The down-count period is a period for AD-converting a pixel signal for reset indicating the level of reset component Vrst output from amplification transistor T12. The time from the start of the down-count period (the start of change of the triangular wave) to the inversion of the output of voltage comparator 252 is down-counted by counter 254. The count value is the AD conversion result of analog reset component Vrst itself.

The up-count period is a period for AD-converting a pixel signal for data indicating the level of a data component (signal component Vsig+reset component Vrst) output from amplification transistor T12. The time from the start of the up-count period (the start of change of the triangular wave) to the inversion of the output of voltage comparator 252 is up-counted by counter 254. This up-count converts the analog data component (Vsig+Vrst) into a digital value. Since the up-count takes, as an initial value, the down-count value indicating reset component Vrst, the count value at the end of the up-count period represents the result of correlated double sampling (CDS) that subtracts reset component Vrst from data component (Vsig+Vrst). In other words, the count value at the end of the up-count period is signal component Vsig itself. Column AD circuit 25 thus performs digital CDS, i.e. extracting only true signal component Vsig by removing variations such as clock skew or counter delay of each column which cause errors.

After this, an operation of reading a pixel signal with a different exposure time in ½ horizontal scanning period by the same sequence is performed, to obtain an image of 1 horizontal scanning period.

Such an operation for ½ horizontal scanning period and an operation for 1 horizontal scanning period are sequentially performed for n rows, as a result of which an image of one frame is obtained.

For example, in the case where the number of images that differ in exposure time is n, an operation of reading a pixel signal with a different exposure time for each 1/n horizontal scanning period by the same sequence is performed n times, as a result of which an image of 1 horizontal scanning period is obtained.

The CDS operation of solid-state imaging device 1 is described below, with reference to FIG. 4.

First, for the first read, controller 20 resets the count value of counter 254 to a set initial value, and sets counter 254 to down-count mode. The initial value of the count value may be "0", or any value.

Next, at time t4, vertical scanning circuit 14 sets (pSEL applied to the selection control line to High level, to set selection transistor T13 of pixel 3 to the on state. Hence, pixel row Vx is selected.

Moreover, at time t4, in a state where φTR applied to the read control line is Low level and read transistor T10 is off, vertical scanning circuit 14 sets (pRS applied to the reset control line to High level, to set reset transistor T11 to on state. Thus, the voltage of floating diffusion layer FD in each pixel 3 is reset to the power voltage.

Following this, at time t5 after a fixed period of time from time t4, vertical scanning circuit 14 sets reset control signal φRS to Low level, to set reset transistor T11 to the off state.

Here, the voltage of floating diffusion layer FD in each pixel 3 is amplified by amplification transistor T12, and reset component Vrst is read via vertical signal line 19. A power variation component from the power voltage has been superimposed on reset component Vrst. During down-count of reset component Vrst, controller 20 supplies control signal CN4 for generating reference signal RAMP, to reference signal generator 27. In response to this, reference signal generator 27 outputs reference signal RAMP having a triangular wave temporally changed in ramp form, as a comparison voltage to one input terminal (+) of voltage comparator 252.

From time t10 to time t14, voltage comparator 252 compares the voltage of reference signal RAMP and the voltage indicating the reset component (Vrst) conveyed from ADC input line 40 (ADINx) of each column.

Simultaneously with the start (time t10) of change of the triangular wave of reference signal RAMP to the input terminal (+) of voltage comparator 252, down-count is started from the set initial value, as the first count operation. In detail, to measure the comparison time in voltage comparator 252 by counter 254 provided for each column, controller 20 feeds count clock CK0 to a clock terminal of counter 254 synchronously with the ramp waveform voltage generated from reference signal generator 27 (time t10), to start down-count from the set initial value as the first count operation.

Moreover, from time t10 to time t14, voltage comparator 252 compares reference signal RAMP from reference signal generator 27 and the voltage (Vrst) of the reset component of the Vxth row conveyed from ADC input line 40. When the two voltages are the same, voltage comparator 252 inverts the output of voltage comparator 252 from H level to L level (time t12). Thus, by comparing the voltage corresponding to reset component Vrst and reference signal RAMP and counting the magnitude in the time axis direction corresponding to the magnitude of reset component Vrst using count clock CK0, the count value corresponding to the magnitude of reset component Vrst is obtained. In other words, counter 254 performs down-count until the output of voltage comparator 252 is inverted with the start time of change of the triangular waveform in reference signal RAMP being the down-count start time of counter 254, thus obtaining the count value corresponding to the magnitude of reset component Vrst.

When a predetermined down-count period has elapsed (time t14), controller 20 stops supplying the control data to voltage comparator 252 and supplying count clock CK0 to counter 254. As a result, voltage comparator 252 stops the triangular wave generation for reference signal RAMP.

During the first read, the count operation is performed by detecting reset component Vrst of the pixel signal voltage of the selected Vxth row by voltage comparator 252. This means reset component Vrst of pixel 3 is read.

Thus, column AD circuit 25 reads the output signal of vertical signal line 19 by CDS (time t14).

Here, a reference signal offset value (time t10) may be set so that reset component Vrst can be detected even when the power variation component is minus.

After the AD conversion for the reset component of the pixel signal ends, the second pixel signal read operation is started. During the second read, an operation of reading, in addition to reset component Vrst, signal component Vsig corresponding to the amount of incident light for each pixel 3 is performed. The difference from the first read lies in that counter 254 is set to up-count mode.

In detail, at time t16, vertical scanning circuit 14 sets read control signal φTR to High level, to set read transistor T10 to the on state. As a result, the whole light charge accumulated in photodiode PD is conveyed to floating diffusion layer FD. Vertical scanning circuit 14 then sets read control signal φTR to Low level, to set read transistor T10 to the off state.

Data component (Vrst+Vsig) of amplification transistor T12 is then read via vertical signal line 19.

In this case, too, the power variation component of the power voltage is superimposed on vertical signal line 19, as in the first read. In this state, counter 254 performs up-count.

During the up-count, reference signal generator 27 feeds reference signal RAMP temporally changed in a stepwise manner so as to be in ramp form to one input terminal (+) of voltage comparator 252 via ADC input line 40 of each column, and voltage comparator 252 compares it with the voltage of the pixel signal component of selected pixel row Vx.

Simultaneously with the feeding of reference signal RAMP to one input terminal (+) of voltage comparator 252, to measure the comparison time in voltage comparator 252 by counter 254, counter 254 starts up-count from the count value at which the down-count is stopped as the second count operation, synchronously with the ramp waveform voltage generated from reference signal generator 27 (time t20).

When the two voltages are the same, voltage comparator 252 inverts the comparator output from H level to L level (time t23).

Thus, column AD circuit 25 reads the output signal of vertical signal line 19 by CDS (time t24).

In detail, by comparing the voltage signal corresponding to data component (Vrst+Vsig) and reference signal RAMP and counting the magnitude in the time axis direction corresponding to the magnitude of signal component Vsig using count clock CK0 from time t20 to time t24, the count value corresponding to the magnitude of signal component Vsig is obtained. In other words, counter 254 performs up-count until the output of voltage comparator 252 is inverted with the start time of change of the triangular wave in reference signal RAMP being the up-count start time of counter 254, thus obtaining the count value corresponding to the magnitude of data component (Vrst+Vsig).

In this way, for example, counter 254 is set to down-count when reading reset component (Vrst) and set to up-count when reading data component (VRSt+Vsig), by digital CDS. Hence, subtraction is automatically performed in counter 254, so that the count value corresponding to signal component Vsig can be obtained.

The AD-converted data (signal component Vsig) is held in memory 256. Thus, before the operation of counter 254 (time t3), the count result of preceding row Vx−1 is transferred to memory 256 based on control signal CN8 which is a memory transfer instruction pulse from controller 20.

Column AD circuit 25 executes digital CDS in pixel read of every pixel row Vx in this way.

In solid-state imaging device 1 according to this embodiment, ½ horizontal scanning period for reading pixel 3 of each pixel row Vx is made up of a down-count period and an up-count period subjected to AD conversion, as illustrated in FIG. 4.

[4. Electronic Shutter and Read Scanning]

Figure 5:
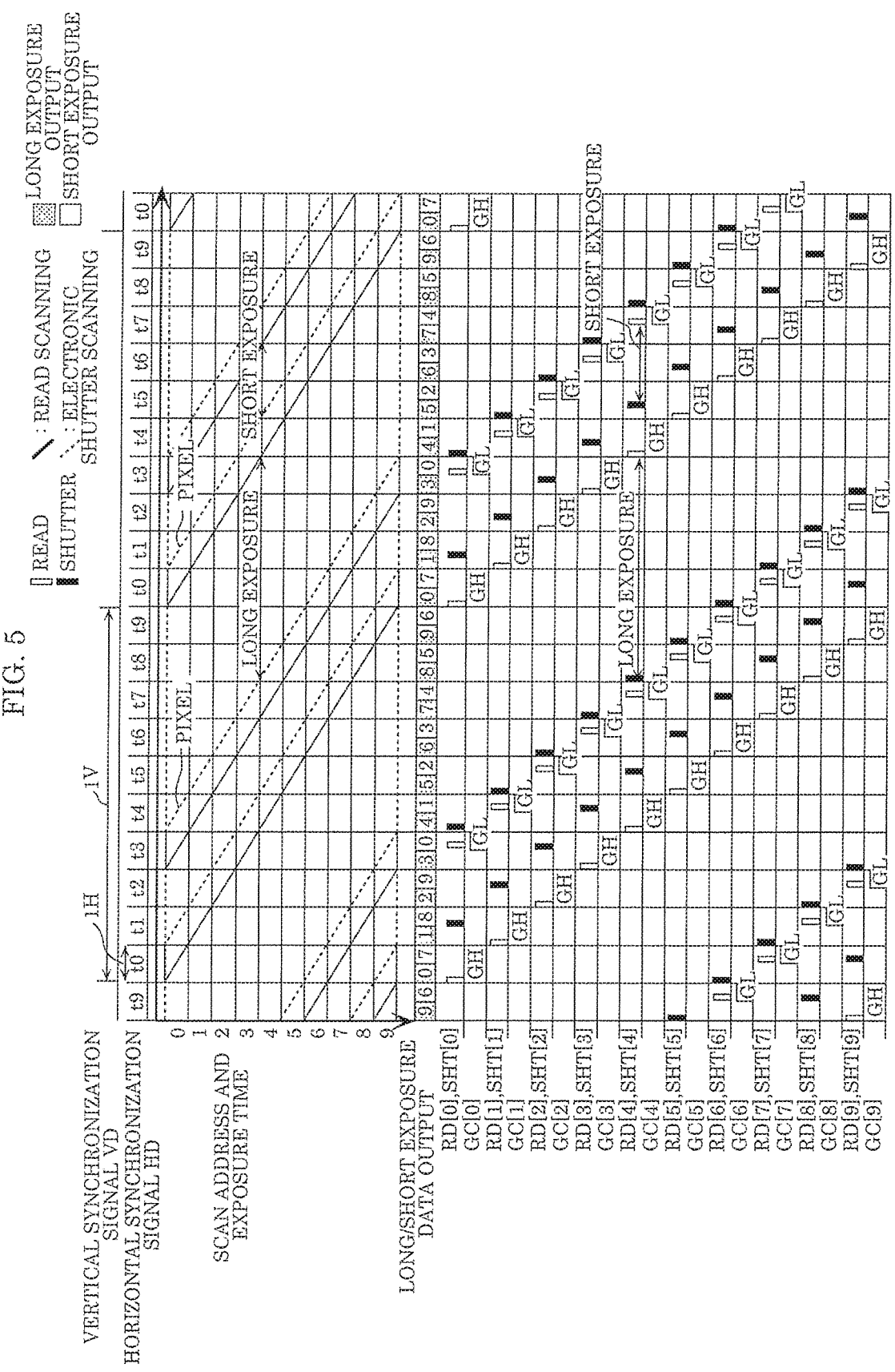
FIG. 5 is a timing chart illustrating the electronic shutter operation and read operation of the solid-state imaging device.

Electronic shutter and read scanning in Embodiment 1 are described below, with reference to FIG. 5. FIG. 5 is a timing chart illustrating the electronic shutter operation and read operation of solid-state imaging device 1 according to Embodiment 1.

The drawing illustrates electronic shutter operation in dark time. In detail, in dark time, solid-state imaging device 1 maximizes the exposure time in a range in which pixel 3 is not saturated in long exposure. FIG. 5 illustrates an example where the number of rows in pixel array unit 10 is ten in total from the 0th row to the 9th row for simplicity's sake, where the exposure time for long exposure is 6H and the exposure time for short exposure is 2H.

The shutter operation in long exposure is performed in a row sequential manner, i.e. the shutter operation is performed on the 0th row in period t4, on the 1st row in period t5, . . . , and on the 9th row in period t3. Thus, the shutter operation in long exposure is carried out at a timing of a predetermined period before the read operation in long exposure so that the exposure time will be the predetermined period (6H in this example).

The read operation in long exposure is performed in a state where φGC=Low and the FD conversion gain is GH. In detail, in the case where the exposure time for long exposure is 6H, the read operation is performed in a row sequential manner, i.e. the read operation is performed on the 0th row in period t0, on the 1st row in period t1, . . . , and on the 9th row in period t9.

The shutter operation in short exposure is performed in a row sequential manner, i.e. the shutter operation is performed on the 0th row in period t8, on the 1st row in period t9, . . . , and on the 9th row in period t7. Thus, the shutter operation in short exposure is carried out at a timing of a predetermined period before the read operation in short exposure so that the exposure time will be the predetermined period (2H in this example).

The read operation in short exposure is performed in a state where φGC=High and the FD conversion gain is GL. In detail, in the case where the exposure time for short exposure is 2H, the read operation is performed in a row sequential manner, i.e. the read operation is performed on the 0th row in period t3, on the 1st row in period t4, . . . , and on the 9th row in period t2.

The read operation in long exposure and the read operation in short exposure are performed in 1 horizontal scanning period as follows. In detail, in this embodiment, the read operation in long exposure is performed in the first half of 1 horizontal scanning period, and the read operation in short exposure is performed in the latter half of 1 horizontal scanning period.

For example, in period t0, the data of the 0th row in long exposure is read in ½ horizontal scanning period in a state where the FD conversion gain is GH, and then the data of the 7th row in short exposure is read in ½ horizontal scanning period in a state where the FD conversion gain is GL. After period t1, such read operation in long exposure and read operation in short exposure are performed in a row sequential manner. Lastly, in period t9, the data of the 9th row in long exposure is read in ½ horizontal scanning period in a state where the FD conversion gain is GH, and then the data of the 6th row in short exposure is read in ½ horizontal scanning period in a state where the FD conversion gain is GL.

The operation in 1 vertical scanning period is thus completed. In this way, each of the data of long exposure (first pixel signal) and the data of short exposure (second pixel signal) is read for each pixel 3 in 1 vertical scanning period.

Such electronic shutter operation and read scanning are achieved by vertical scanning circuit 14 scanning pixel array unit 10 under control of controller 20. Controller 20 causes pixel 3 to use high FD conversion gain during long exposure, and low FD conversion gain during short exposure. In detail, controller 20 causes each of the plurality of pixels 3 to perform long exposure (exposure in a first exposure mode) and convert the charge into the voltage with GH (first gain) to output the data of long exposure (first pixel signal). Controller 20 also causes each of the plurality of pixels 3 to perform short exposure (exposure in a second exposure mode shorter in exposure time than the first exposure mode) and convert the charge into the voltage with GL (second gain, where GL<GH) to output the data of short exposure (second pixel signal).

The data of long exposure and the data of short exposure output in this way are synthesized (wide dynamic range synthesis) by WDR synthesis circuit 70. The features regarding WDR synthesis circuit 70 are described in detail below.

[5. Wide Dynamic Range Synthesis Method]

Figure 6:
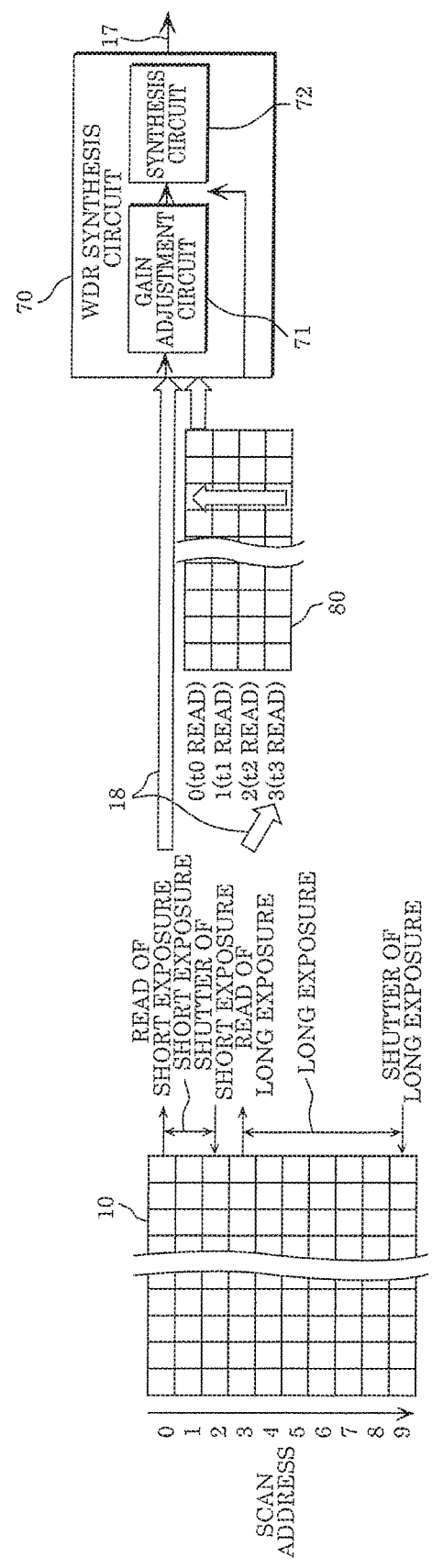
FIG. 6 is a diagram conceptually illustrating a wide dynamic range synthesis method.

FIG. 6 is a diagram conceptually illustrating a wide dynamic range synthesis method in period t3 in FIG. 5. As illustrated in FIG. 5, in period t3, the read operation for the data of short exposure is performed in the 0th row, and the shutter operation in short exposure is performed in the 2nd row. Moreover, the read operation for the data of long exposure is performed in the 3rd row, and the shutter operation in long exposure is performed in the 9th row.

In period t3, second memory 80 stores the data of long exposure from the 0th row to the 3rd row read in periods t0 to t3.

WDR synthesis circuit 70 includes gain adjustment circuit 71 and synthesis circuit 72 as illustrated in FIG. 6, and operates as follows. First, gain adjustment circuit 71 performs amplification so that the data of short exposure and the data of long exposure will be linear with each other. Following this, synthesis circuit 72 performs a process of synthesizing the data of long exposure and the data of short exposure. WDR synthesis circuit 70 then performs a white balance process.

Thus, WDR synthesis circuit 70 is a signal processor that performs signal processing using the data of long exposure (first pixel signal) and the data of short exposure (second pixel signal). In detail, WDR synthesis circuit 70 uses the data of short exposure (other pixel signal) from among the data of long exposure and the data of short exposure and the data of long exposure (one pixel signal) stored in second memory 80 (storage), in association with each other for each row. WDR synthesis circuit 70 amplifies the data of short exposure so that its inclination after the amplification with respect to the amount of incident light will be linear with the data of long exposure, and synthesizes the data of short exposure after the amplification and the data of long exposure.

In detail, WDR synthesis circuit 70 amplifies the data of short exposure with an amplification factor corresponding to gain ratio GHIGL of GH (first gain, i.e. FD conversion gain during long exposure) to GL (second gain, i.e. FD conversion gain during short exposure) and the exposure time ratio of long exposure to short exposure (exposure time ratio of the first exposure mode to the second exposure mode).

Solid-state imaging device 1 according to this embodiment configured in this way can achieve both image quality enhancement in dark time and dynamic range expansion, as compared with a conventional solid-state imaging device that synthesizes a plurality of images different in exposure time without switching the FD conversion gain. To facilitate understanding, the comparison with the conventional solid-state imaging device (comparative example in the drawing) is given below, with reference to FIG. 7.

Figure 7:
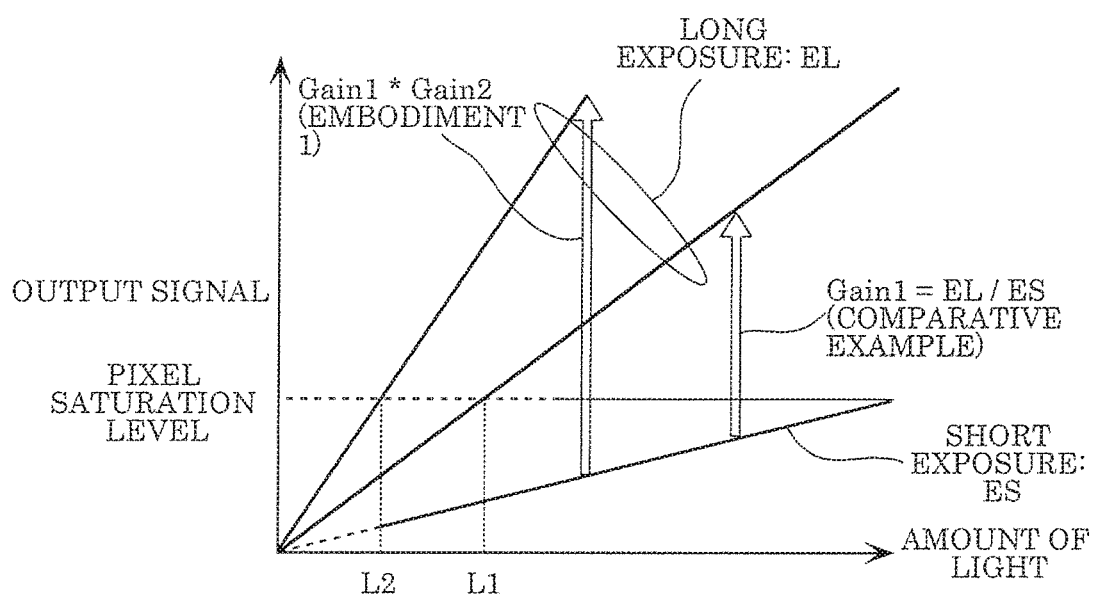
FIG. 7 is a diagram conceptually illustrating a process of synthesizing an image of long exposure and an image of short exposure to obtain one image.

FIG. 7 is a diagram conceptually illustrating a process of synthesizing an image of long exposure and an image of short exposure to obtain one image.

Here, the exposure time for long exposure is denoted by EL, the exposure time for short exposure is denoted by ES, the high FD conversion gain (FD conversion gain during long exposure) is denoted by GH (first gain), and the low FD conversion gain (FD conversion gain during short exposure) is denoted by GL (second gain).

From dark time to bright time, the exposure time ratio between long exposure and short exposure is set to be the same. Accordingly, in dark time, the exposure time for long exposure is maximized in a range in which pixel 3 is not saturated, in a state where the ratio is maintained. In bright time, on the other hand, the exposure time for short exposure is maximized in a range in which pixel 3 is not saturated, in a state where the ratio is maintained.

The conventional solid-state imaging device amplifies the output level of short exposure by the exposure time ratio of long exposure to short exposure (Gain1=EL/ES), in order to expand the dynamic range. The part greater than or equal to the amount of light L1 at which the pixel is saturated in long exposure is then linearly corrected by the output level of short exposure after the amplification, thus synthesizing the image of short exposure and the image of long exposure.

On the other hand, solid-state imaging device 1 according to this embodiment increases the FD conversion gain during read of long exposure. In detail, solid-state imaging device 1 according to this embodiment amplifies the FD conversion gain (Gain2=GH/GL) during read of long exposure as compared with during read of short exposure. Hence, the output level of short exposure is amplified by the exposure time ratio of long exposure to short exposure and the FD gain ratio (Gain1×Gain2), in order to expand the dynamic range. The part greater than or equal to the amount of light L2 at which the pixel is saturated in long exposure is then linearly corrected by the output level of short exposure after the amplification, thus synthesizing the image of short exposure and the image of long exposure.

Thus, solid-state imaging device 1 according to this embodiment can generate an image using data of short exposure which is not saturated, even in the case where the amount of light received by photodiode PD is high, i.e. in the case of a bright object, as with the conventional solid-state imaging device. Since an image is generated using data not reaching the saturation level, accurate gray scale expression can be realized. Therefore, the dynamic range can be expanded.

Moreover, solid-state imaging device 1 according to this embodiment can generate an image with high SN image quality by increasing the FD conversion gain in the case where the amount of light received by photodiode PD is low, i.e. in the case of a dark object, as compared with the conventional solid-state imaging device. Image quality can thus be enhanced. Further, in this case, the increase in FD conversion gain contributes to improved resolution for the amount of light received. Accordingly, high-resolution gray scale expression can be realized.

In the case of capturing an object in which a bright portion and a dark portion coexist, solid-state imaging device 1 according to this embodiment generates one image using the following signal as the output signal corresponding to each pixel 3. For pixel 3 corresponding to the bright portion from among the plurality of pixels 3, the image data of short exposure after the amplification is used. For pixel 3 corresponding to the dark portion from among the plurality of pixels 3, the image data of long exposure is used. In this way, even in the case of capturing an object in which a bright portion and a dark portion coexist, an image with favorable image quality in the dark portion can be obtained without blown-out highlights in the bright portion.

In detail, solid-state imaging device 1 according to this embodiment causes each of the plurality of pixels 3 to perform long exposure and convert the charge into the voltage with the first gain (GH) to output the data of long exposure, and causes each of the plurality of pixels 3 to perform short exposure and convert the charge into the voltage with the second gain (GL, where GL<GH) to output the data of short exposure. WDR synthesis circuit 70 then amplifies the data of short exposure so that its inclination after the amplification with respect to the amount of incident light will be linear with the data of long exposure, and synthesizes the data of short exposure after the amplification and the data of long exposure.

This achieves both image quality enhancement in dark time and dynamic range expansion.

Variation 1 of Embodiment 1

The pixel structure having the FD gain switching function is not limited to the structure described in Embodiment 1.

Figure 8A:
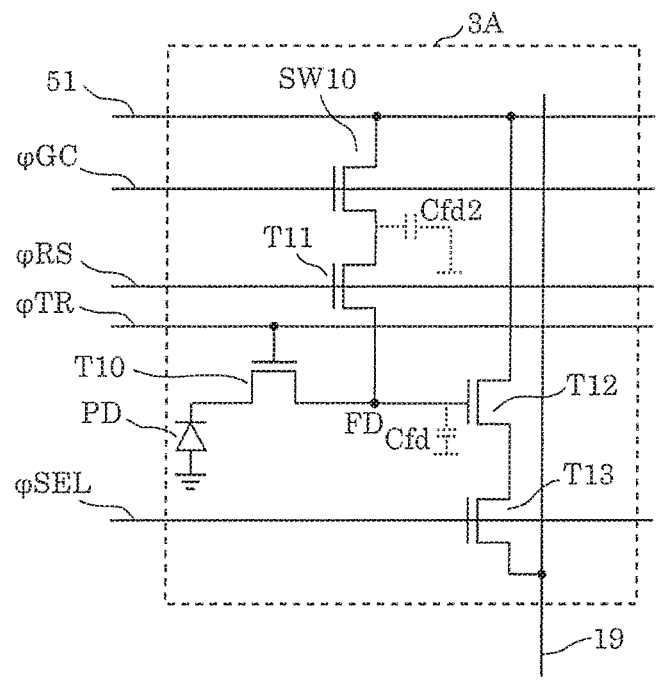
FIG. 8A is a circuit diagram illustrating the structure of a pixel according to Variation 1 of Embodiment 1.
Figure 8B:
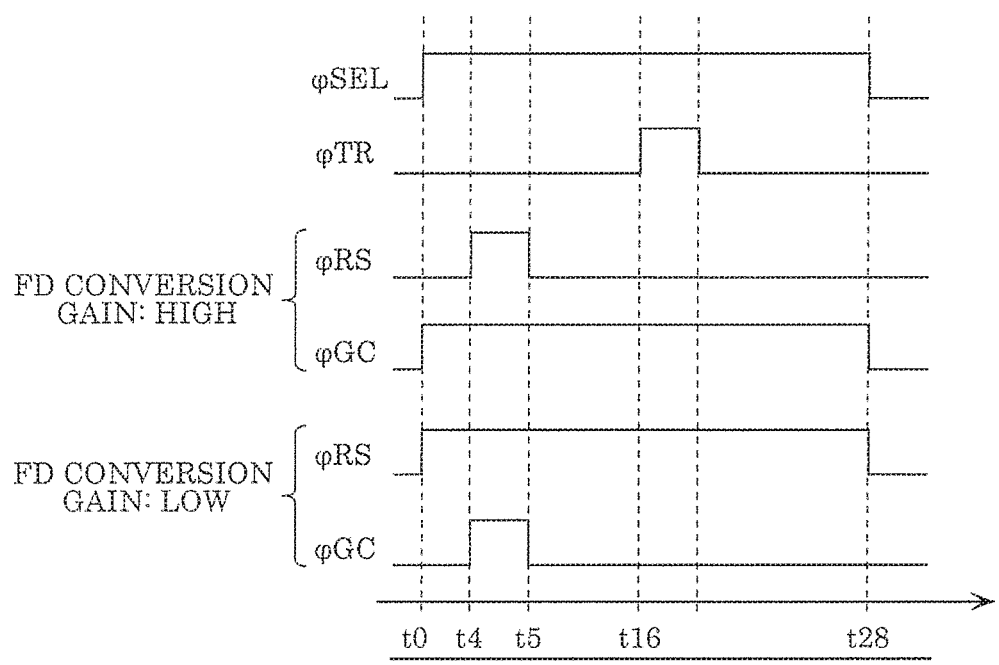
FIG. 8B is a timing chart illustrating the operation of the pixel.

FIG. 8A is a circuit diagram illustrating the structure of pixel 3A according to Variation 1 of Embodiment 1. FIG. 8B is a timing chart illustrating the operation of pixel 3A.

The structure and operation of pixel 3A illustrated in these drawings differ from those of pixel 3 illustrated in FIG. 2A in the features related to gain control switch element SW10 and additional capacitor Cfd2.

In detail, gain control switch element SW10 is connected to floating diffusion layer FD via reset transistor T11.

Additional capacitor Cfd2 is connected to a node between reset transistor T11 and gain control switch element SW10.

Pixel 3A with such a structure is capable of switching the FD conversion gain, as with pixel 3 in Embodiment 1.

The FD conversion gain is switched by switching reset transistor T11 between the on state and the off state according to the polarity of reset control signal φRS. In detail, as illustrated in FIG. 8B, when φRS=Low during read (time t16 in the drawing), reset transistor T11 is in the off state, so that the capacitance of floating diffusion layer FD will be Cfd. In this case, the FD conversion gain is high. When φRS=High during read, reset transistor T11 is in the on state, so that the capacitance of floating diffusion layer FD will be Cfd+Cfd2. In this case, the FD conversion gain is low.

In other words, controller 20 sets reset transistor T11 to the off state to cause floating diffusion layer FD to convert the charge into the voltage with the first gain (GH), and sets reset transistor T11 to the on state and gain control switch element SW10 to the off state to cause floating diffusion layer FD to convert the charge into the voltage with the second gain (GL, where GL<GH).

Variation 2 of Embodiment 1

The exposure time for long exposure and the exposure time for short exposure are not limited to the times described in Embodiment 1. For example, in bright time, the exposure time may be shorter than that described in Embodiment 1.

Figure 9:
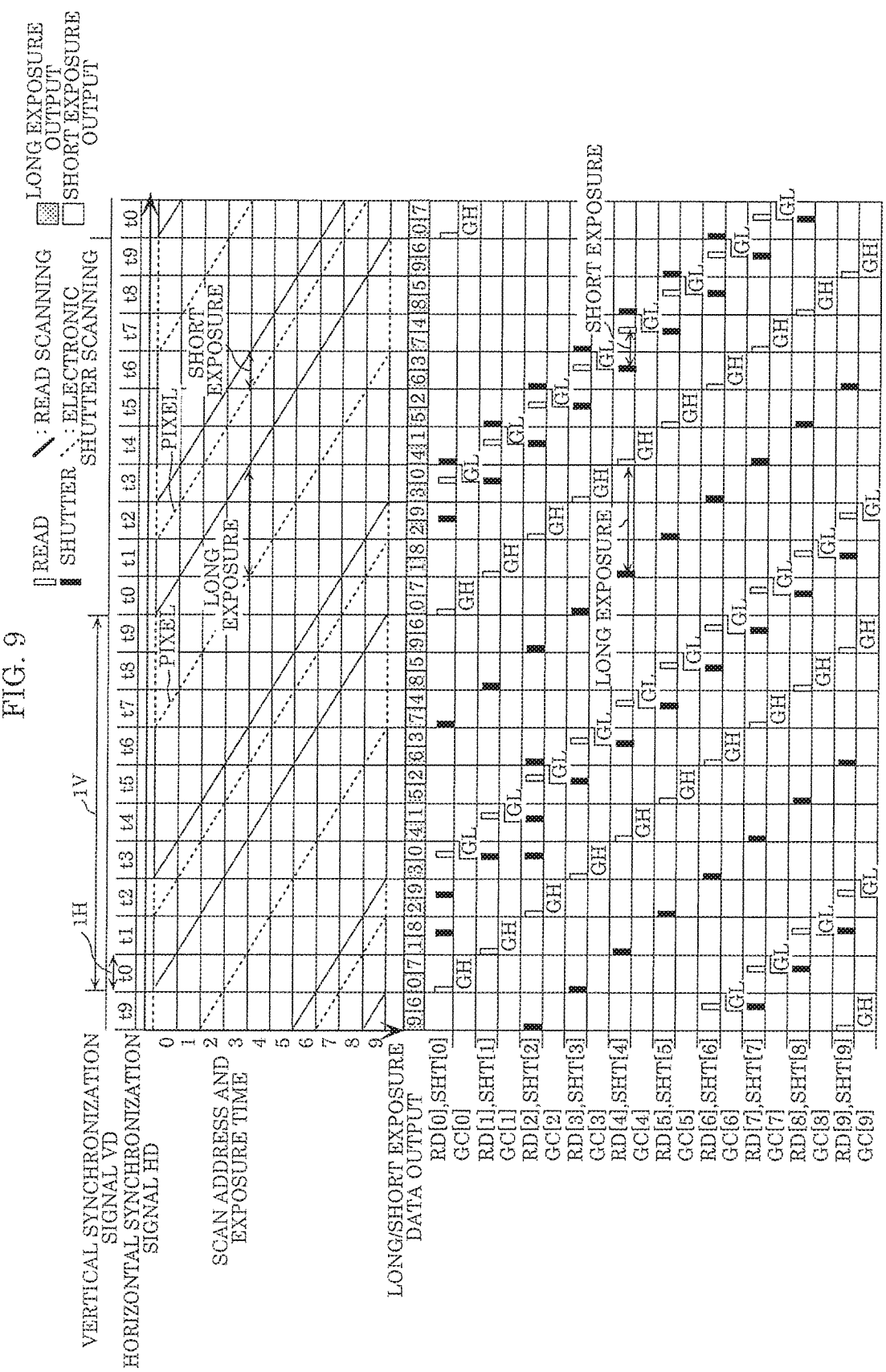
FIG. 9 is a timing chart illustrating the electronic shutter operation and read operation of a solid-state imaging device according to Variation 2 of Embodiment 1.

Electronic shutter and read scanning in Variation 2 of Embodiment 1 are described below, with reference to FIG. 9. FIG. 9 is a timing chart illustrating the electronic shutter operation and read operation of the solid-state imaging device according to Variation 2 of Embodiment 1.

The drawing illustrates electronic shutter operation in bright time. In detail, in bright time, the solid-state imaging device maximizes the exposure time in a range in which pixel 3 is not saturated in short exposure, and determines the exposure time for long exposure so as to have the same ratio between long exposure and short exposure in dark time described in Embodiment 1. That is, controller 20 sets a longer exposure time for lower illuminance values, while maintaining the ratio in exposure time of long exposure (first exposure mode) to short exposure (second exposure mode). FIG. 9 illustrates an example where the exposure time for long exposure is 3H and the exposure time for short exposure is 1H.

The shutter operation in long exposure is performed in a row sequential manner, i.e. the shutter operation is performed on the 0th row in period t7, on the 1st row in period t8, . . . , and on the 9th row in period t6.

The read operation in long exposure is performed in a state where φGC=Low and the FD conversion gain is GH. In detail, in the case where the exposure time for long exposure is 3H, the read operation is performed in a row sequential manner, i.e. the read operation is performed on the 0th row in period t0, on the 1st row in period t1, . . . , and on the 9th row in period t9.

The shutter operation in short exposure is performed in a row sequential manner, i.e. the shutter operation is performed on the 0th row in period t2, on the 1st row in period t3, . . . , and on the 9th row in period t1.

The read operation in short exposure is performed in a state where φGC=High and the FD conversion gain is GL. In detail, in the case where the exposure time for short exposure is 2H, the read operation is performed in a row sequential manner, i.e. the read operation is performed on the 0th row in period t3, on the 1st row in period t4, . . . , and on the 9th row in period t2.

The read operation in long exposure and the read operation in short exposure are performed as follows, as in Embodiment 1. The read operation in long exposure is performed in the first half of 1 horizontal scanning period, and the read operation in short exposure is performed in the latter half of 1 horizontal scanning period.

The solid-state imaging device operating in this way can enhance image quality by increasing the FD conversion gain during long exposure and expand the dynamic range by decreasing the FD conversion gain during short exposure, as with solid-state imaging device 1 in Embodiment 1. The solid-state imaging device according to each of Variations 1 and 2 can therefore achieve both image quality enhancement in dark time and dynamic range expansion.

Embodiment 2

In Variation 2 of Embodiment 1, in bright time, the solid-state imaging device maximizes the exposure time in a range in which the pixel is not saturated in short exposure, and determines the exposure time for long exposure so as to have the same ratio between long exposure and short exposure in dark time in FIG. 5 (see FIG. 9).

In Embodiment 2, for a pixel low in sensitivity, the exposure time is maximized for both short exposure and long exposure in a range in which the pixel is not saturated in order to improve shot noise, as compared with Embodiment 1 and its Variation 2.

Figure 10A:
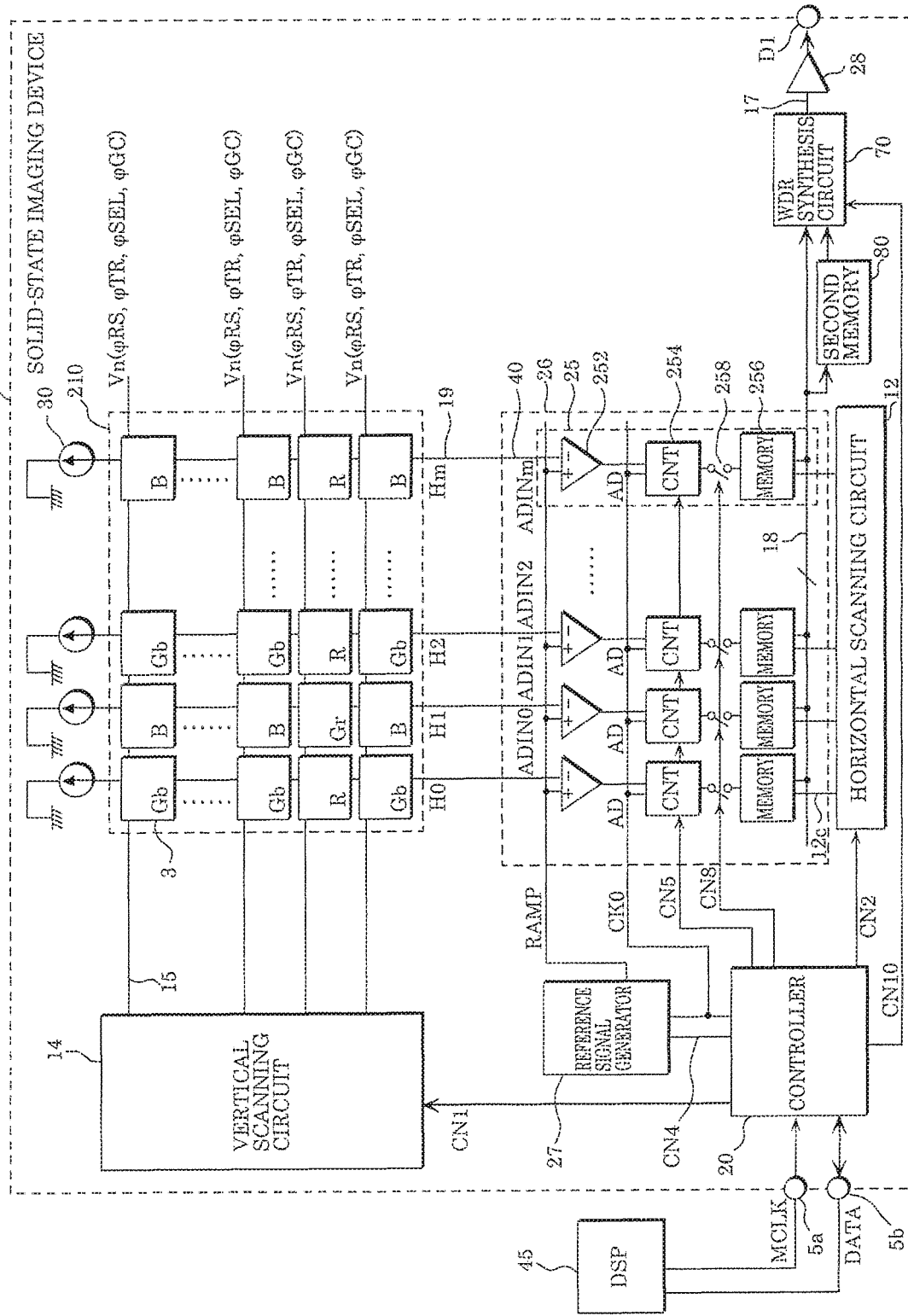
FIG. 10A is a block diagram illustrating an example of the structure of a solid-state imaging device according to Embodiment 2.

FIG. 10A is a block diagram illustrating an example of the structure of solid-state imaging device 2 according to this embodiment. Solid-state imaging device 2 illustrated in the drawing differs from solid-state imaging device 1 according to Embodiment 1 in that it includes Bayer-arrayed pixel array unit 210.

DSP 45 may be included in solid-state imaging device 2.

Figure 10B:
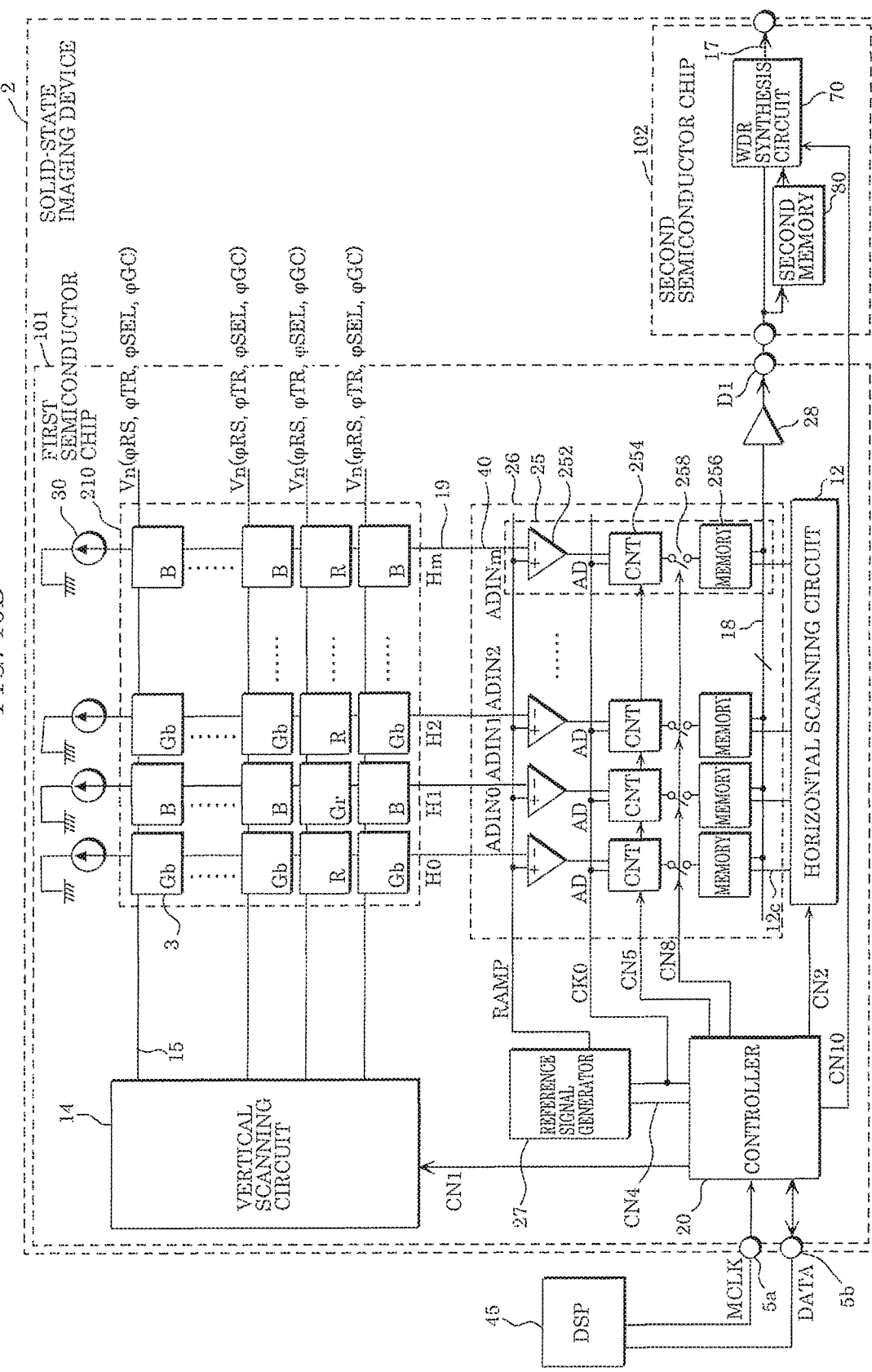
FIG. 10B is a block diagram illustrating another example of the structure of the solid-state imaging device according to Embodiment 2.

Solid-state imaging device 2 may be formed on a plurality of semiconductor chips (e.g. two semiconductor chips). FIG. 10B is a block diagram illustrating an example of the structure of such solid-state imaging device 2. As illustrated in FIG. 10B, solid-state imaging device 2 according to this embodiment may have at least the plurality of pixels 3 formed on fuirst semiconductor chip 101, and at least second memory 80 and WDR synthesis circuit 70 formed on second semiconductor chip 102 other than first semiconductor chip 101.

Figure 11:
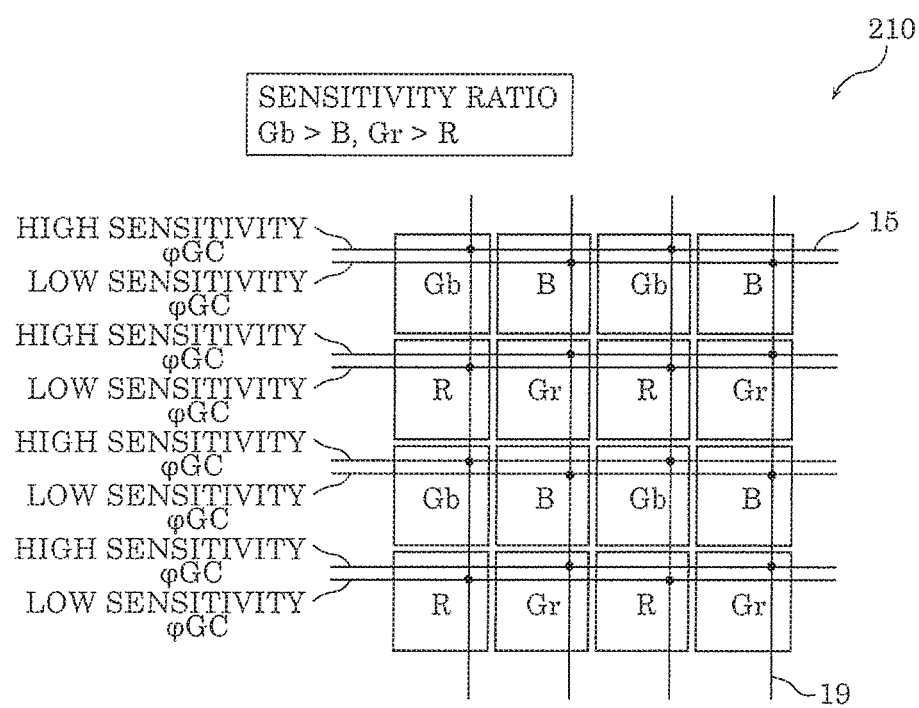
FIG. 11 is a diagram illustrating an array in part of a pixel array unit.

FIG. 11 is a diagram illustrating an array in part of pixel array unit 210. In pixel array unit 210, high-sensitivity Gb pixel and Gr pixel (hereafter referred to as pixel A) and low-sensitivity R pixel and B pixel (hereafter referred to as pixel B) are alternately arranged in the horizontal direction, as illustrated in the drawing. That is, the plurality of pixels included in pixel array unit 210 include pixel A (first pixel) having first sensitivity and pixel B (second pixel) having second sensitivity lower than the first sensitivity, where pixel A and pixel B are adjacent to each other in the same row.

In this embodiment, pixel A and pixel B different in sensitivity are arranged adjacent to each other in the horizontal direction, and are each independently capable of performing shutter and read scanning. In other words, horizontal scanning line group 15 is provided for each of pixel A and pixel B independently. Here, the signals of pixel A and pixel B can be AD-converted simultaneously, as illustrated in FIG. 10A.

[Electronic Shutter and Read Scanning]

Figure 12:
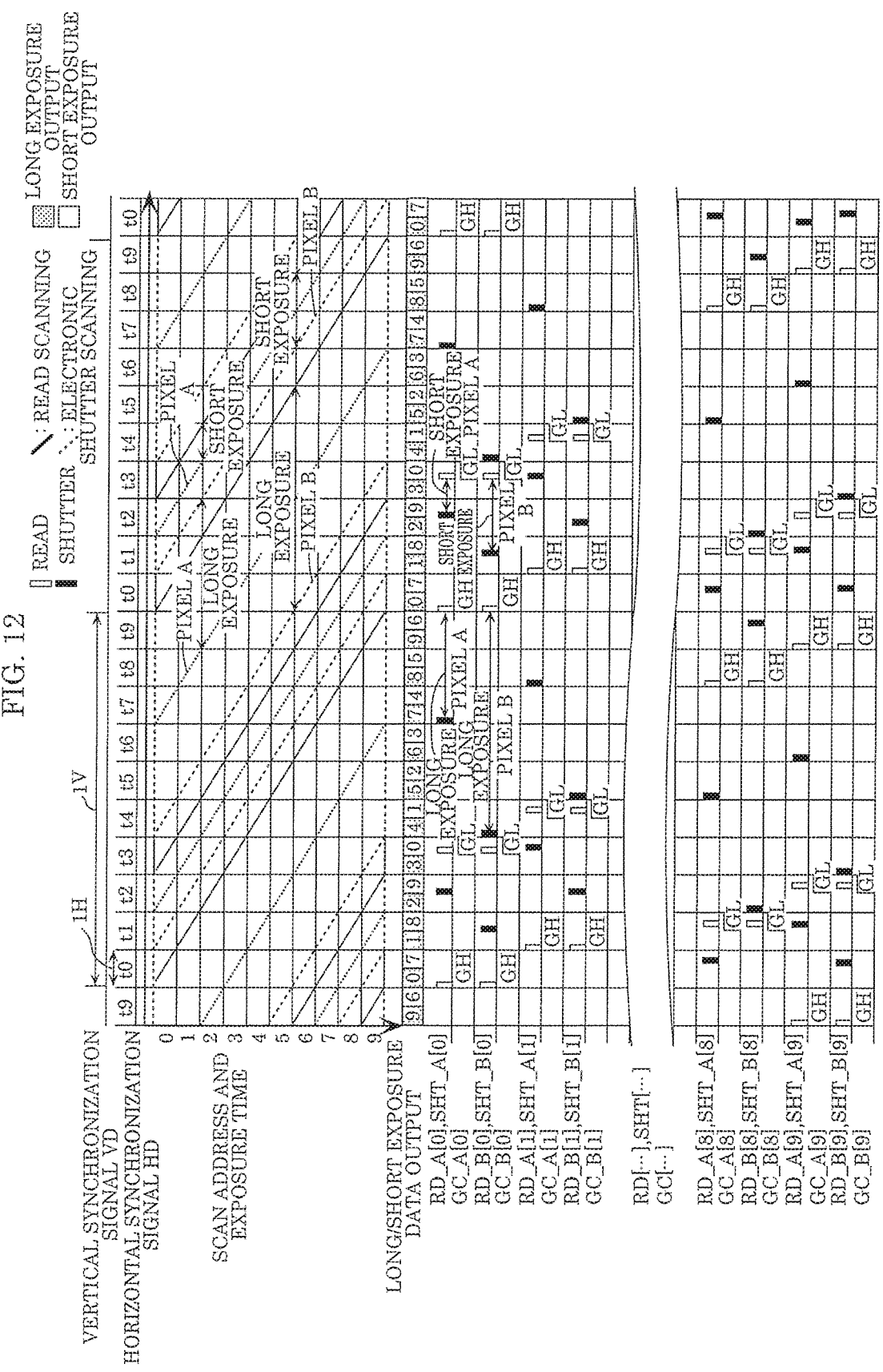
FIG. 12 is a timing chart illustrating the electronic shutter operation and read operation of the solid-state imaging device according to Embodiment 2.

Electronic shutter and read scanning in Embodiment 2 are described below, with reference to FIG. 12. FIG. 12 is a timing chart illustrating the electronic shutter operation and read operation of solid-state imaging device 2 according to Embodiment 2.

The drawing illustrates electronic shutter operation in bright time. In detail, in bright time, independently for each of pixel A and pixel B different in sensitivity, solid-state imaging device 2 maximizes the exposure time in a range in which the pixel is not saturated in short exposure, and determines the exposure time for long exposure so as to have the same ratio between long exposure and short exposure in dark time.

For example, when the sensitivity ratio between pixel A and pixel B different in sensitivity is Gain3=SA/SB=2 times, the exposure time ratio between pixel B and pixel A is equally set to Gain3=2 times. Here, the exposure time for long exposure in pixel A is 3H, and the exposure time for short exposure in pixel A is 1H. Moreover, the exposure time for long exposure in pixel B is 6H, and the exposure time for short exposure in pixel B is 2H.

For pixel A, the shutter operation in long exposure is performed in a row sequential manner, i.e. the shutter operation is performed on the 0th row in period t7, on the 1st row in period t8, . . . , and on the 9th row in period t6. For pixel B, the shutter operation in long exposure is performed in a row sequential manner, i.e. the shutter operation is performed on the 0th row in period t4, on the 1st row in period t5, . . . , and on the 9th row in period t3.

The read operation in long exposure is performed in a state where φGC=Low and the FD conversion gain is GH. In detail, for pixel A, in the case where the exposure time for long exposure is 3H, the read operation is performed in a row sequential manner, i.e. the read operation is performed on the 0th row in period t0, on the 1st row in period t1, . . . , and on the 9th row in period t9. For pixel B, in the case where the exposure time for long exposure is 6H, the read operation is performed in a row sequential manner, i.e. the read operation is performed on the 0th row in period t0, on the 1st row in period t1, . . . , and on the 9th row in period t9.

For pixel A, the shutter operation in short exposure is performed in a row sequential manner, i.e. the shutter operation is performed on the 0th row in period t2, on the 1st row in period t3, . . . , and on the 9th row in period t1. For pixel B, the shutter operation in short exposure is performed in a row sequential manner, i.e. the shutter operation is performed on the 0th row in period t1, on the 1st row in period t2, . . . , and on the 9th row in period t0.

The read operation in short exposure is performed in a state where φGC=High and the FD conversion gain is GL. In detail, for pixel A, in the case where the exposure time for short exposure is 2H, the read operation is performed in a row sequential manner, i.e. the read operation is performed on the 0th row in period t3, on the 1st row in period t4, . . . , and on the 9th row in period t2. For pixel B, in the case where the exposure time for short exposure is 1H, the read operation is performed in a row sequential manner, i.e. the read operation is performed on the 0th row in period t3, on the 1st row in period t4, . . . and on the 9th row in period t2.

The read operation in long exposure and the read operation in short exposure are performed as follows, as in Embodiment 1. The read operation in long exposure is performed in the first half of 1 horizontal scanning period, and the read operation in short exposure is performed in the latter half of 1 horizontal scanning period. The operation in 1 vertical scanning period is thus completed.

Such electronic shutter operation and read scanning are achieved by vertical scanning circuit 14 scanning pixel array unit 210 under control of controller 20. Controller 20 causes pixel 3 to use high FD conversion gain during long exposure, and low FD conversion gain during short exposure, as in Embodiment 1.

Moreover, controller 20 causes longer exposure of pixel B (second pixel) than pixel A (first pixel) in each of long exposure (first exposure mode) and short exposure (second exposure mode).

In detail, controller 20 causes pixel B to perform exposure for the time obtained by multiplying the exposure time of pixel A by sensitivity ratio Gain3 (Gain3=2 in this embodiment) which is the ratio in sensitivity of pixel A to pixel B, in each of long exposure and short exposure. For example, in long exposure, controller 20 causes pixel B to perform exposure for an exposure time of 6H obtained by multiplying exposure time 3H of pixel A by Gain3. In short exposure, controller 20 causes pixel B to perform exposure for an exposure time of 2H obtained by multiplying exposure time 1H of pixel A by Gain3.

The data of long exposure and the data of short exposure output in this way are synthesized (wide dynamic range synthesis) by WDR synthesis circuit 70, as in Embodiment 1. The features regarding WDR synthesis circuit 70 are described in detail below.

[Wide Dynamic Range Synthesis Method]

Figure 13:
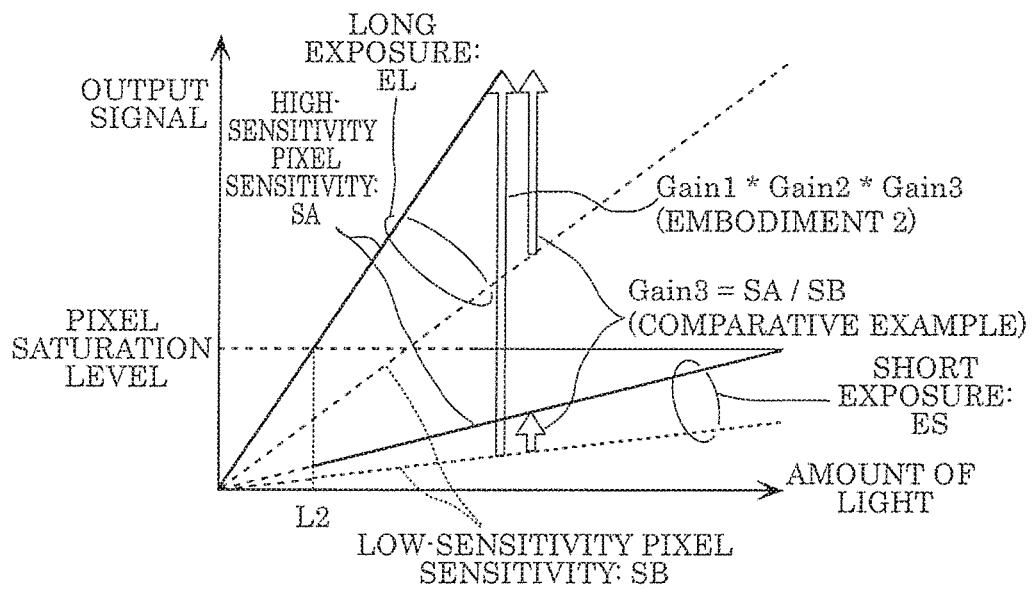
FIG. 13 is a diagram conceptually illustrating a process of synthesizing an image of long exposure and an image of short exposure to obtain one image.

FIG. 13 is a diagram conceptually illustrating a process of synthesizing an image of long exposure and an image of short exposure to obtain one image in Embodiment 2. The drawing also illustrates a comparative example for Embodiment 2.

The solid-state imaging device according to the comparative example multiplies sensitivity ratio Gain3 between pixel A and pixel B for each of long exposure data and short exposure data, in order to correct image quality unevenness caused by the difference in sensitivity.

On the other hand, solid-state imaging device 2 according to this embodiment increases the FD conversion gain during read of long exposure. Moreover, solid-state imaging device 2 according to this embodiment amplifies the exposure time of pixel B by (Gain3=SA/SB) times so that the signal level of pixel B having low sensitivity will be equal to the signal level of pixel A having high sensitivity. Hence, the output level of short exposure is amplified further by the sensitivity ratio in addition to Embodiment 1 (Gain1×Gain2×Gain3), in order to expand the dynamic range. The part greater than or equal to the amount of light L2 at which the pixel is saturated in long exposure is then linearly corrected by the output level of short exposure after the amplification, thus synthesizing the image of short exposure and the image of long exposure.

Solid-state imaging device 2 according to this embodiment thus achieves the same advantageous effects as in Embodiment 1, even with a structure in which pixel A and pixel B different in sensitivity are arranged adjacent to each other. In other words, both image quality enhancement in dark time and dynamic range expansion can be achieved.

Solid-state imaging device 2 according to this embodiment also maximizes, for pixel B low in sensitivity, the exposure time for both short exposure and long exposure in a range in which pixel B is not saturated in order to improve shot noise, as described above. In detail, controller 20 causes pixel B (second pixel) to perform exposure for the longest time that limits the total exposure time in long exposure (first exposure mode) and short exposure (second exposure mode) to less than or equal to 1 vertical scanning period and induces no saturation in each of long exposure (first exposure mode) and short exposure (second exposure mode).

In a process of transitioning from bright time to dark time, for pixel B having low sensitivity and long exposure time, the exposure time is controlled to be constant at the maximum so that the total exposure time of long exposure and short exposure will be less than or equal to 1 vertical synchronization signal period (1V) (i.e. 1 vertical scanning period). For pixel A having high sensitivity and short exposure time, the exposure time is controlled so that it will increase while maintaining the ratio between long exposure and short exposure and also the total exposure time is less than or equal to 1 vertical synchronization signal period (1V). In dark time, for both high-sensitivity pixel A and low-sensitivity pixel B, the exposure time is controlled so that the total exposure time of long exposure and short exposure will be the same and be less than or equal to 1 vertical synchronization signal period (1V).

Thus, controller 20 causes pixel A (first pixel) to perform exposure so that the total exposure time in long exposure (first exposure mode) and short exposure (second exposure mode) will be less than or equal to 1 vertical scanning period. Controller 20 also causes pixel B (second pixel) to perform exposure for the time obtained by multiplying the total exposure time by the sensitivity ratio (Gain3) in the case where the time is less than or equal to 1 vertical scanning period, and causes pixel B to perform exposure for a predetermined time less than or equal to 1 vertical scanning period in the case where the time is greater than 1 vertical scanning period.

As a method of setting the ratio between long exposure and short exposure in wide dynamic range, conditions are determined so that no problem in SN caused by shot noise will occur upon synthesis at illuminance (L2 in FIG. 13) corresponding to the boundary portion. Although this embodiment describes the case where the ratio between long exposure and short exposure is fixed in order to simplify the synthesis method, the ratio may be variable.

Figure 14:
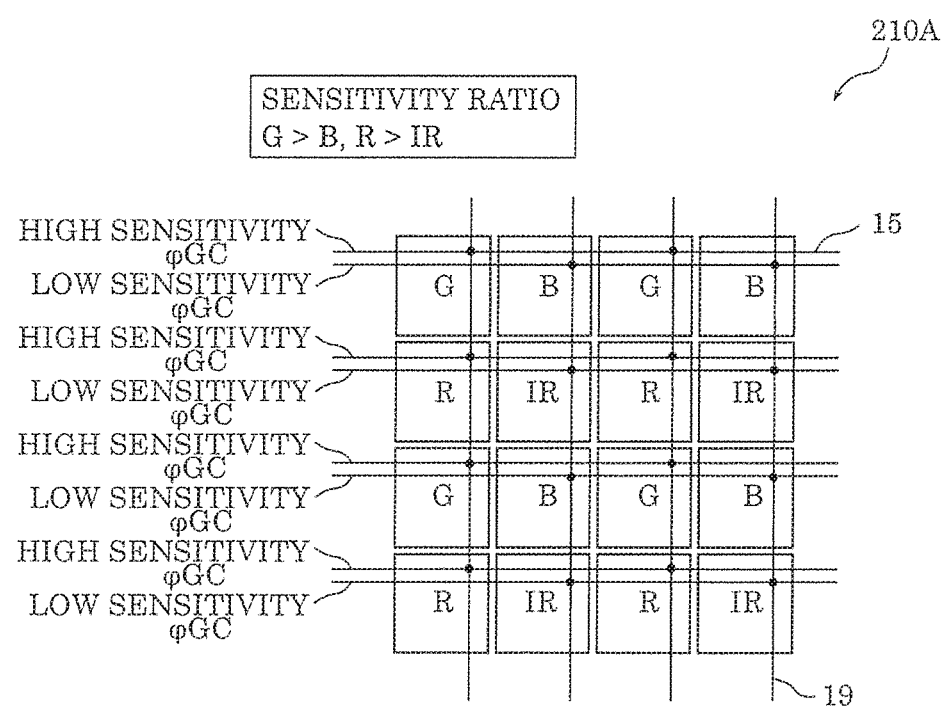
FIG. 14 is a diagram illustrating an array in part of a variation of the pixel array unit.

The pixel array unit is not limited to the example described above. For example, the pixel array unit may have a structure illustrated in FIG. 14. FIG. 14 is a diagram illustrating an array in part of pixel array unit 210A which is a variation of this embodiment. In pixel array unit 210A illustrated in the drawing, Gr pixel is IR (infrared) pixel as compared with pixel array unit 210 illustrated in FIG. 11.

G pixel and B pixel have such sensitivities that G pixel>B pixel, and R pixel and IR pixel have such sensitivities that R pixel>IR pixel. Thus, in pixel array unit 210A, high-sensitivity pixel A (G pixel and R pixel in this example) and low-sensitivity pixel B (B pixel and IR pixel in this example) are alternately arranged in the horizontal direction, as in pixel array unit 210.

The solid-state imaging device including pixel array unit 210A achieves the same advantageous effects as in Embodiment 2. In other words, both image quality enhancement in dark time and dynamic range expansion can be achieved.

Other Embodiments

The solid-state imaging device according to each of the foregoing embodiments and their variations is used in a camera (imaging apparatus).

Figure 15:
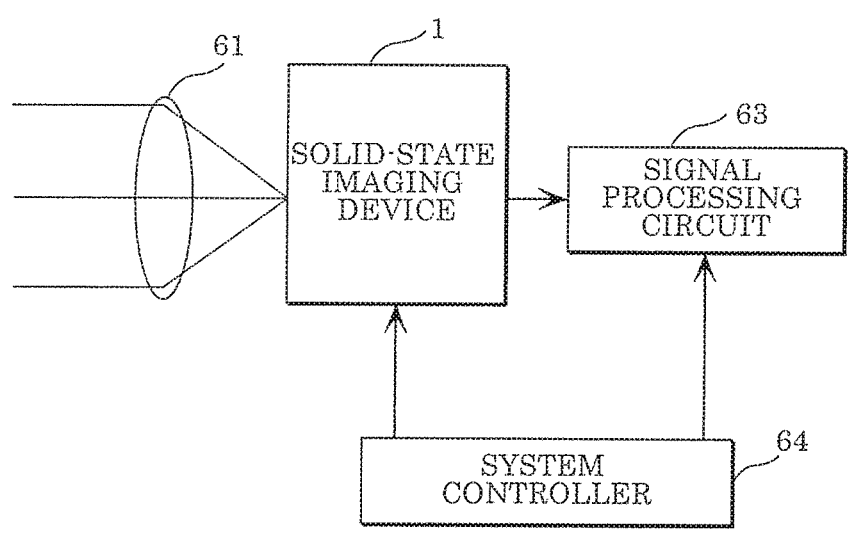
FIG. 15 is a block diagram illustrating an example of the structure of a camera including the solid-state imaging device according to Embodiment 1.

FIG. 15 is a block diagram illustrating an example of the structure of a camera (imaging apparatus) including solid-state imaging device 1 according to Embodiment 1. The camera (imaging apparatus) in the drawing includes solid-state imaging device 1, lens 61, signal processing circuit 63, and system controller 64.

With such a structure, a camera (imaging apparatus) that achieves both image quality enhancement in dark time and dynamic range expansion can be provided.

Although the above describes the case where pixel 3 is formed on the front surface of the semiconductor substrate, i.e. the same surface on which gate terminals and wires of transistors are formed, in the solid-state imaging device, the structure of a backside-illumination image sensor (backside-illumination solid-state imaging device) in which pixel 3 is formed on the back surface of the semiconductor substrate, i.e. the opposite surface to the surface on which gate terminals and wires of transistors are formed, may be used.

Although the above describes the case where pixel 3 operates in two exposure modes of long exposure and short exposure, pixel 3 may operate in three or more exposure modes that differ in exposure time. In this case, a higher FD conversion gain may be set when the exposure time is longer.

Controller 20 and the like according to each of the foregoing embodiments may be typically realized by LSI which is an integrated circuit. The processing units such as controller 20 may each be individually implemented as one chip, or may be partly or wholly implemented on one chip.

Although the above describes the case where photodiode (depletion-type p-n junction photodiode) PD is used as a light-receiving element in pixel 3 in solid-state imaging device 1, this is not a limitation, and other light-receiving elements (e.g. depletion region induced by an electric field below a photo gate) may be used.

The integrated circuit technology is not limited to LSI, and may be realized by a dedicated circuit or a general-purpose processor. A field programmable gate array (FPGA) which can be programmed or a reconfigurable processor which is capable of reconfiguring connections and settings of circuit cells in LSI after LSI manufacturing may be used.

Although exemplary embodiments have been described above, the claims according to the present disclosure are not limited to these embodiments. Without departing from new teachings and benefits on the subject matters described in the attached claims, various modifications may be applied in each of the foregoing embodiments, and it will be easily understood by those skilled in the art that other embodiments may be devised by combining structural elements of the foregoing embodiments in any way. Accordingly, such variations and other embodiments are included in the scope of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can achieve both image quality enhancement in dark time and dynamic range expansion, and is applicable to, for example, various camera systems such as CMOS solid-state imaging devices, digital still cameras, movie cameras, camera mobile phones, surveillance cameras, vehicle cameras, and medical-use cameras.

What is claimed is:

1. A solid-state imaging device comprising:
   a pixel including a photoelectric converter that generates a charge and a charge accumulator that converts the charge into a voltage;
   a controller that causes the pixel to perform exposure in a first exposure mode and convert the charge into the voltage with a first gain to output a first pixel signal, and causes the pixel to perform exposure in a second exposure mode and convert the charge into the voltage with a second gain to output a second pixel signal, the second exposure mode being shorter in exposure time than the first exposure mode, and the second gain being lower than the first gain; and
   a signal processor that synthesizes the second pixel signal after amplification and the first pixel signal,
   wherein the signal processor amplifies the second pixel signal with an amplification factor that corresponds to a gain ratio of the first gain to the second gain and an exposure time ratio of the first exposure mode to the second exposure mode.

2. The solid-state imaging device according to claim 1, comprising:
   a storage that stores one pixel signal from among the first pixel signal and the second pixel signal, in association with a pixel row in which a plurality of pixels including the pixel are arranged in a row direction,
   wherein the signal processor associates, with the pixel row, an other pixel signal from among the first pixel signal and the second pixel signal and the one pixel signal stored in the storage, and amplifies the second pixel signal to cause an inclination of the second pixel signal after the amplification with respect to an amount of light incident on the photoelectric converter to be linear with the first pixel signal.

3. The solid-state imaging device according to claim 2, wherein at least the pixel is formed on a first semiconductor chip, and at least the storage and the signal processor are formed on a second semiconductor chip.

4. The solid-state imaging device according to claim 1, wherein the pixel includes a gain control switch element connected to the charge accumulator, and a capacitor connected to the charge accumulator via the gain control switch element, and
   the controller sets the gain control switch element to a non-conducting state to cause the charge accumulator to convert the charge into the voltage with the first gain, and sets the gain control switch element to a conducting state to cause the charge accumulator to convert the charge into the voltage with the second gain.

5. The solid-state imaging device according to claim 1, wherein the pixel includes a reset switch element that resets a voltage of the charge accumulator to a power voltage, a gain control switch element connected to the charge accumulator via the reset switch element, and a capacitor connected to a node between the reset switch element and the gain control switch element, and
   the controller sets the reset switch element to a non-conducting state to cause the charge accumulator to convert the charge into the voltage with the first gain, and sets the reset switch element to a conducting state and the gain control switch element to a non-conducting state to cause the charge accumulator to convert the charge into the voltage with the second gain.

6. An imaging apparatus comprising the solid-state imaging device according to claim 1.

7. A solid-state imaging device comprising:
   a pixel including a photoelectric converter that generates a charge and a charge accumulator that converts the charge into a voltage;
   a controller that causes the pixel to perform exposure in a first exposure mode and convert the charge into the voltage with a first gain to output a first pixel signal, and causes the pixel to perform exposure in a second exposure mode and convert the charge into the voltage with a second gain to output a second pixel signal, the second exposure mode being shorter in exposure time than the first exposure mode, and the second gain being lower than the first gain; and
   a signal processor that synthesizes the second pixel signal after amplification and the first pixel signal,
   wherein a plurality of pixels including the pixel include a first pixel having a first sensitivity and a second pixel located adjacent to the first pixel in a same row and having a second sensitivity lower than the first sensitivity, and
   the controller causes longer exposure of the second pixel than the first pixel in each of the first exposure mode and the second exposure mode.

8. The solid-state imaging device according to claim 7, wherein the controller causes the second pixel to perform exposure for a time obtained by multiplying an exposure time of the first pixel by a sensitivity ratio of the first sensitivity to the second sensitivity, in each of the first exposure mode and the second exposure mode.

9. The solid-state imaging device according to claim 8, wherein the controller:
causes the first pixel to perform exposure, with a total exposure time in the first exposure mode and the second exposure mode being less than or equal to 1 vertical scanning period; and
causes the second pixel to perform exposure for a time obtained by multiplying the total exposure time and the sensitivity ratio in a case where the time is less than or equal to 1 vertical scanning period, and causes the second pixel to perform exposure for a predetermined time less than or equal to 1 vertical scanning period in a case where the time is greater than 1 vertical scanning period.

10. The solid-state imaging device according to claim 7, wherein the controller causes the second pixel to perform exposure for a longest time that limits a total exposure time in the first exposure mode and the second exposure mode to less than or equal to 1 vertical scanning period and induces no saturation in each of the first exposure mode and the second exposure mode.

\* \* \* \* \*